US011928307B2

(12) United States Patent
King et al.

(10) Patent No.: US 11,928,307 B2
(45) Date of Patent: Mar. 12, 2024

(54) GUIDED OPERATOR VR TRAINING

(71) Applicant: Caterpillar Paving Products Inc., Brooklyn Park, MN (US)

(72) Inventors: David A. King, Blaine, MN (US); Todd Willis Mansell, Rogers, MN (US); Eric Remboldt, Rapid City, SD (US); Matt Peasley, Rapid City, SD (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/693,202

(22) Filed: Mar. 11, 2022

(65) Prior Publication Data
US 2023/0289028 A1    Sep. 14, 2023

(51) Int. Cl.
*G06F 3/0481* (2022.01)
*G02B 27/01* (2006.01)
*G06F 3/01* (2006.01)
*G06F 3/04815* (2022.01)
*G06F 3/0482* (2013.01)
*G09B 5/02* (2006.01)
*G09B 9/052* (2006.01)

(52) U.S. Cl.
CPC ....... *G06F 3/04815* (2013.01); *G02B 27/017* (2013.01); *G06F 3/014* (2013.01); *G09B 9/052* (2013.01)

(58) Field of Classification Search
CPC ... G06F 3/04815; G06F 3/014; G02B 27/017; G09B 9/052
See application file for complete search history.

(56) References Cited

U.S. PATENT DOCUMENTS

| | | | | |
|---|---|---|---|---|
| 9,752,303 | B2* | 9/2017 | Jackson | E02F 9/26 |
| 10,008,038 | B2* | 6/2018 | Miller | G06F 3/013 |
| 10,388,176 | B2* | 8/2019 | Wallace | G09B 5/06 |
| 10,646,767 | B2* | 5/2020 | Kudirka | G02B 27/0101 |
| 10,810,899 | B1* | 10/2020 | MacGillivray | G06T 17/10 |
| 11,087,551 | B2* | 8/2021 | Kjallstrom | G06F 3/017 |
| 11,561,609 | B2* | 1/2023 | Song | G02B 27/017 |
| 2012/0154572 | A1* | 6/2012 | Stratton | G05D 1/0044 348/114 |

(Continued)

FOREIGN PATENT DOCUMENTS

| | | |
|---|---|---|
| CN | 206688206 U | 12/2017 |
| CN | 112908084 A | 6/2021 |

(Continued)

*Primary Examiner* — Jordany Nunez

(74) *Attorney, Agent, or Firm* — Procopio, Cory, Hargreaves & Savitch LLP

(57) ABSTRACT

Aspects disclosed herein provide an operator training system that can train an operator about basic machine movements, operations, and applications, such as asphalt compactor rolling patterns, paving-by-numbers, milling-by-numbers, etc. with the use of a virtual reality headset at any point or time on a work site. The operator training system uses data received from the virtual reality headset and associated hand controls to guide the operator via training scenarios. The operator training system also includes providing immediate feedback on the outcome of the training scenario and may also identify one or more areas of improvement.

18 Claims, 27 Drawing Sheets

(56) References Cited

U.S. PATENT DOCUMENTS

| | | | | |
|---|---|---|---|---|
| 2014/0184643 A1* | 7/2014 | Friend | | G09G 3/003 |
| | | | | 345/633 |
| 2014/0188333 A1* | 7/2014 | Friend | | E02F 9/261 |
| | | | | 701/34.4 |
| 2015/0029017 A1* | 1/2015 | Thoreson | | G08B 5/36 |
| | | | | 340/461 |
| 2015/0199106 A1* | 7/2015 | Johnson | | G06F 3/011 |
| | | | | 715/740 |
| 2015/0221230 A1 | 8/2015 | Karadjian et al. | | |
| 2015/0376868 A1* | 12/2015 | Jackson | | E02F 9/26 |
| | | | | 701/50 |
| 2017/0148214 A1* | 5/2017 | Muniz-Simas | | A61B 5/024 |
| 2017/0205814 A1* | 7/2017 | Marsolek | | G06F 3/04847 |
| 2017/0205999 A1* | 7/2017 | Marsolek | | G06F 3/04847 |
| 2019/0057548 A1* | 2/2019 | Singh | | G09B 25/02 |
| 2019/0186084 A1* | 6/2019 | Marsolek | | E01C 19/48 |
| 2019/0347000 A1* | 11/2019 | Marsolek | | G06Q 10/06 |
| 2019/0392728 A1* | 12/2019 | Pike | | G06T 19/003 |
| 2020/0066173 A1* | 2/2020 | Wallace | | G09B 5/06 |
| 2020/0071912 A1* | 3/2020 | Kennedy | | G06V 20/17 |
| 2020/0160607 A1* | 5/2020 | Kjallstrom | | G06T 19/006 |
| 2020/0201307 A1* | 6/2020 | Marsolek | | G06Q 10/08 |
| 2020/0332479 A1* | 10/2020 | O'Donnell | | E01C 19/004 |
| 2021/0034796 A1* | 2/2021 | Santarone | | G06Q 99/00 |
| 2021/0116990 A1* | 4/2021 | Song | | G02B 27/017 |
| 2021/0295048 A1* | 9/2021 | Buras | | A61B 8/466 |
| 2021/0335145 A1* | 10/2021 | Denn | | G02B 27/017 |
| 2021/0343182 A1* | 11/2021 | Lu | | G09B 19/24 |
| 2022/0005175 A1* | 1/2022 | Mansell | | H04L 67/125 |
| 2022/0114905 A1* | 4/2022 | Shiffman | | G06F 3/04842 |
| 2022/0136214 A1* | 5/2022 | Hurd | | E02F 9/264 |
| | | | | 701/32.4 |
| 2022/0334551 A1* | 10/2022 | Sommer | | G05B 19/406 |
| 2022/0364829 A1* | 11/2022 | Wallack | | G02B 27/0101 |
| 2023/0009234 A1* | 1/2023 | Ogawa | | E02F 9/261 |
| 2023/0141588 A1* | 5/2023 | Nagel | | G05D 1/0044 |
| | | | | 705/7.26 |

FOREIGN PATENT DOCUMENTS

| | | |
|---|---|---|
| CN | 113628324 A | 11/2021 |
| KR | 101950698 B1 | 2/2019 |

* cited by examiner

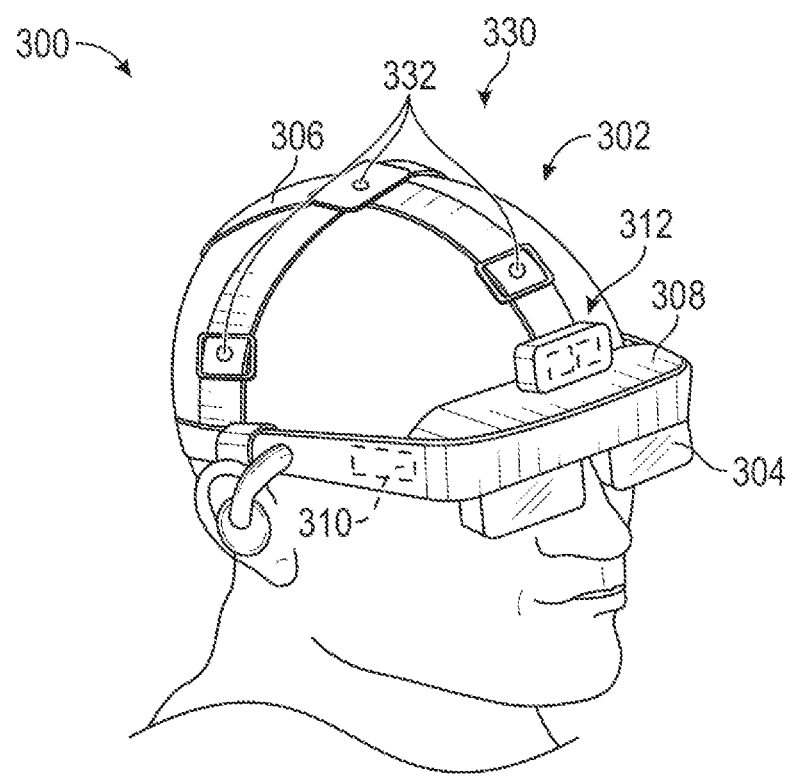
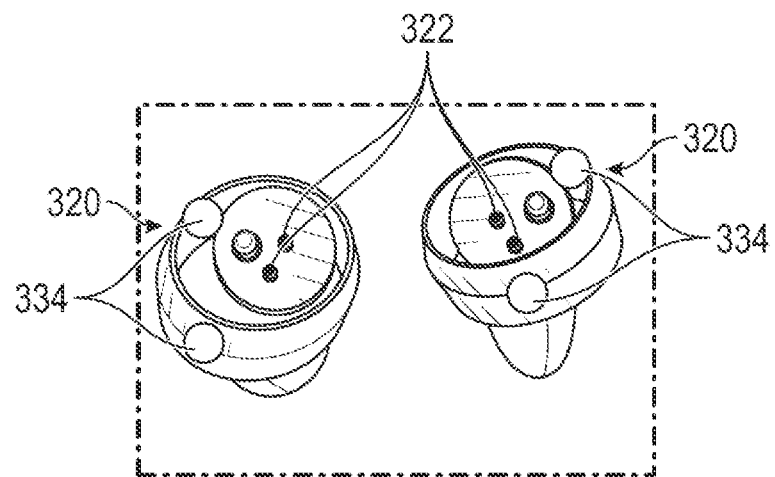
FIG. 3

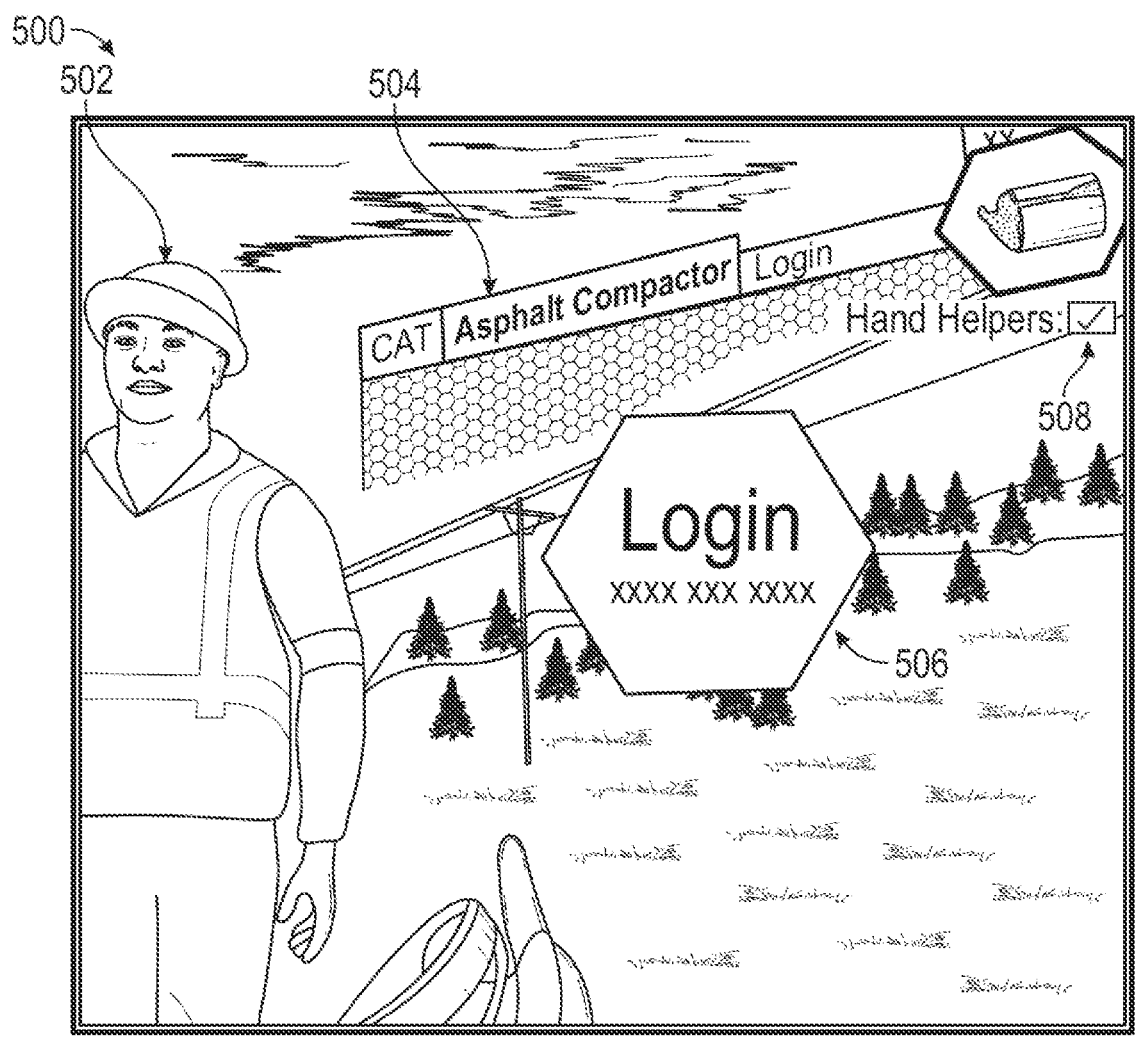
FIG. 5A
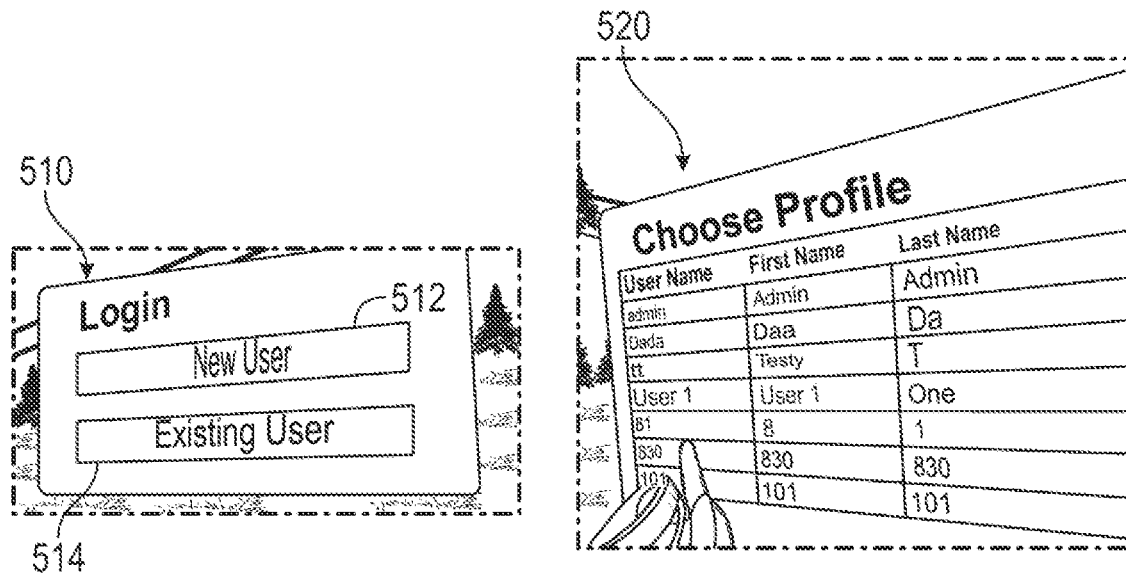
FIG. 5B
FIG. 5C

GUIDED OPERATOR VR TRAINING

BACKGROUND

Field of the Invention

The embodiments described herein are generally directed to an image display system and, more particularly, to a system utilizing virtual reality to train and assess an operator at a point of need.

Description of the Related Art

Movable machines, such as asphalt compactors, haul trucks, dozers, motor graders, excavators, wheel loaders, and other types of equipment are used to perform a variety of tasks. For example, these machines may be used to move material and/or alter work surfaces at a work site. The machines may perform operations such rolling patterns, digging, loosening, carrying, etc., different materials at the work site.

Due to the size, configuration, and complexity of the machines, operators may be specially trained to operate a respective machine. However, on any particular day, an operator may be unavailable to operate a machine. While some work sites may have multiple operators with the capability to operate the machine, in other work sites, a replacement operator may be trained to operate the machine before actually operating the machine.

In some examples, a work site may include or have access to a standalone training device provided for the purpose of training a potential operator on the use of a machine, such as an asphalt compactor. However, such standalone training devices may be associated with a large acquisition cost and, thus, may be an impractical solution for use in certain work sites. In some examples, the provider or manufacturer of the machine may provide training sessions on how to operate the machine. However, such training sessions may be provided at fixed intervals (e.g., one a month, etc.) and/or may need the potential operator to travel to attend the training sessions.

Virtual reality based techniques provide opportunities for simulating training of a working machine. For example, Chinese Patent Publication No. CN112908084A describes a simulation training system for working machinery via a simulated cockpit of the working machinery, and Korean Patent Publication No. KR101950698B1 describes a virtual reality device that detects, senses, and educates a learner's spatial position using a camera and a sensor. However, neither of these references address a virtual reality application to train and assess an operator at a point of need.

The present disclosure is directed toward overcoming one or more of the obstacles to facilitating training and assessing an operator at a point of need, as well as other problems discovered by the inventors.

SUMMARY

Accordingly, a display system is disclosed for training and assessing an operator at a point of need, such as a work site.

In an embodiment, an operator training system for operator training includes a head mountable display device including a display screen, at least one hand control including at least one navigation control, a controller in communication with the head mountable display device and the at least one hand control. The controller may be configured to: generate a first set of graphical user interfaces associated with setup of an operator training application; display the first set of graphical user interfaces via the display screen; receive, from the at least one hand control, data based on at least one virtual object displayed via the first set of graphical user interfaces; generate, based in part on the data, a second set of graphical user interfaces associated with a training scenario corresponding to a machine on a work site; and display the second set of graphical user interfaces via the display screen.

In an embodiment, a computer-implemented method for operator training includes: generating, at a controller, a first set of graphical user interfaces associated with setup of an operator training application; displaying, via a display screen of a head mountable display device in communication with the controller, the first set of graphical user interfaces; receiving, from at least one hand control in communication with the controller, data based on at least one virtual object displayed via the first set of graphical user interfaces; generating, based in part on the data, a second set of graphical user interfaces associated with a training scenario corresponding to a machine on a work site; and displaying the second set of graphical user interfaces via the display screen.

In an embodiment, a non-transitory computer-readable medium having instructions stored therein, wherein the instructions, when executed, cause the processor to: generate, at a controller, a first set of graphical user interfaces associated with setup of an operator training application; display, via a display screen of a head mountable display device in communication with the controller, the first set of graphical user interfaces; receive, from at least one hand control in communication with the controller, data based on at least one virtual object displayed via the first set of graphical user interfaces; generate, based in part on the data, a second set of graphical user interfaces associated with a training scenario corresponding to a machine on a work site; and display the second set of graphical user interfaces via the display screen.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3 is a diagrammatic perspective view of a head mountable display system, in accordance with various aspects of the present disclosure.

FIGS. 4 to 25 are pictorial illustrations of exemplary disclosed graphical user interfaces that may be generated by a user system of FIG. 2 and/or the head mountable display system of FIG. 3 to facilitate guided operator training, in accordance with various aspects of the present disclosure.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
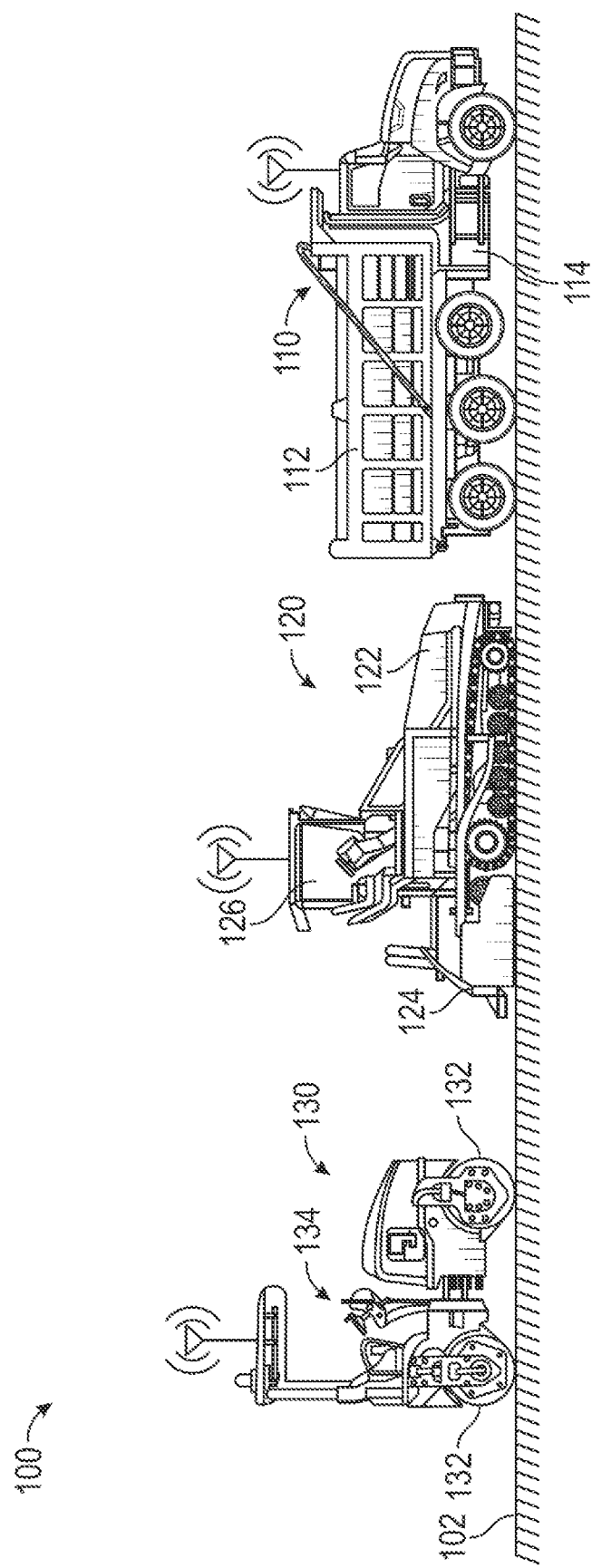
FIG. 1 illustrates an example road construction work site, in accordance with various aspects of the present disclosure.

FIG. 1 illustrates an example work site 100 to facilitate road surfacing operations, as presented herein. In the illustrated example, a plurality of machines may be employed to perform the road surfacing operations, such as laying down an asphalt layer onto a work surface 102. The surfacing operation may include completing different tasks according to a planned design model of the finished road. Each machine may be used to perform one or more of the different tasks based on the types of operations that each respective machine is configured to perform. Thus, each machine may be particularly configured to perform certain tasks that other machines may not be configured to perform.

In the illustrated example of FIG. 1, the machines at the work site 100 include a haul truck 110, a paving machine 120 ("paver"), and a compacting machine 130 ("compactor"). However, other examples may include additional or alternate machines. The haul truck 110 may be a mobile machine and include a bed 112 attached to a frame 114 for carrying an amount of material, such as paving material (e.g., asphalt), from a first location, such as an asphalt production plant, to a second location, such as the work site 100.

The paving machine 120 may be a wheeled machine or a tracked machine equipped with a hopper 122 at a front side of the paving machine 120 for storing paving material to be deposited on to the work surface 102. Material from the hopper 122 may be moved, via a conveyor system, to a rear side of the paving machine 120, where the material may be deposited onto the work surface 102. The material may be distributed across at least a portion of a width of the paving machine 120 by an auger or other distribution device.

A screed 124 may be connected to the rear end of the paving machine 120, and the paving machine 120 may pull the screed 124 over the freshly deposited material to create a mat of paving material having a desired thickness on top of the work surface 102. The screed 124 may include one or more screed plates that smooth out the fresh paving material. The screed plates may be adjustable via one or more associated actuators for changing a height, width, and/or slope of the screed plates. Operating parameters, such as a groundspeed of the paving machine 120 and the height, width, and/or slope of the screed plates may be controlled from an operator station 126 using a plurality of control devices of the paving machine 120.

The compacting machine 130 may be equipped with a compacting tool 132 configured to compact the material beneath them. As shown in FIG. 1, the compacting machine 130 may be include a compacting tool 132 at the front end and at the rear end. The compacting machine 130 may be supported on the work surface 102 by the compacting tool 132 and may be propelled via a hydraulic system operatively connected to and driven by a power source, such as an engine. Operating parameters, such as a groundspeed, a travel direction, and/or other parameters related to the compacting machine 130 may be controlled from an operator station 134 using a plurality of control devices of the compacting machine 130.

In some examples, the compacting tool 132 may include a drum having a smooth outer surface configured to engage and compact the work surface 102. The drum may include an internal vibratory system including one or more eccentric weights driven by motors. The eccentric weights may vibrate the compacting tool 132 at a certain frequency and amplitude to cause greater compaction of the material beneath the compacting tool 132. The frequency and amplitude of the vibratory system may be controlled from the operator station 134 of the compacting machine 130.

The haul truck 110 may transport hot asphalt from a plant to the work site 100 so that when the asphalt is located on the paving machine 120, the temperature of the asphalt is high enough to be properly deposited and compacted. When the surfacing operation at the work site 100 is delayed for any reason, the haul truck 110 can be delayed from unloading its fresh asphalt, which can lead to the fresh asphalt being significantly reduced in temperature. In such scenarios, the amount of time available for the paving machine 120 to deposit the asphalt and for the compacting machine 130 to compact the deposited asphalt before it becomes too cool and unworkable is reduced.

It may be appreciated that the haul truck 110, the paving machine 120, and the compacting machine 130 described herein are merely illustrative and that the concepts and/or systems described herein are applicable to other work site machines, such as a Combi-roller, pneumatic rollers, etc.

It may be appreciated that delays in the paving process can create situations in which the haul truck 110, the paving machine 120, and/or the compacting machine 130 sit idly until the paving process resumes, which can reduce the overall efficiency of the surfacing operation. One such scenario that may result in one or more of the machines at the work site 100 sitting idly includes an operator of a machine that is unavailable to operate the respective machine.

Aspects disclosed herein describe an immediate point of need operator training system for machine walk around, machine operation, and application training. For example, aspects disclosed herein include a virtual reality (VR) stand-alone headset that can be deployed at a point of need (e.g., on a jobsite, at a work site, etc.) to train a machine operator and other personnel on a basic machine walk around and machine operation, and/or more detailed guided training. The disclosed aspects also provide immediate learning assessments to an operator and/or to administrator(s) to drive immediate feedback on the outcome of leaning and/or areas for improvement.

Although the following description may be focused on a guided operator training system for an asphalt compactor, the concepts and/or systems described herein are applicable to other work site machines for which immediate point of need training and assessment may be beneficial.

Figure 2:
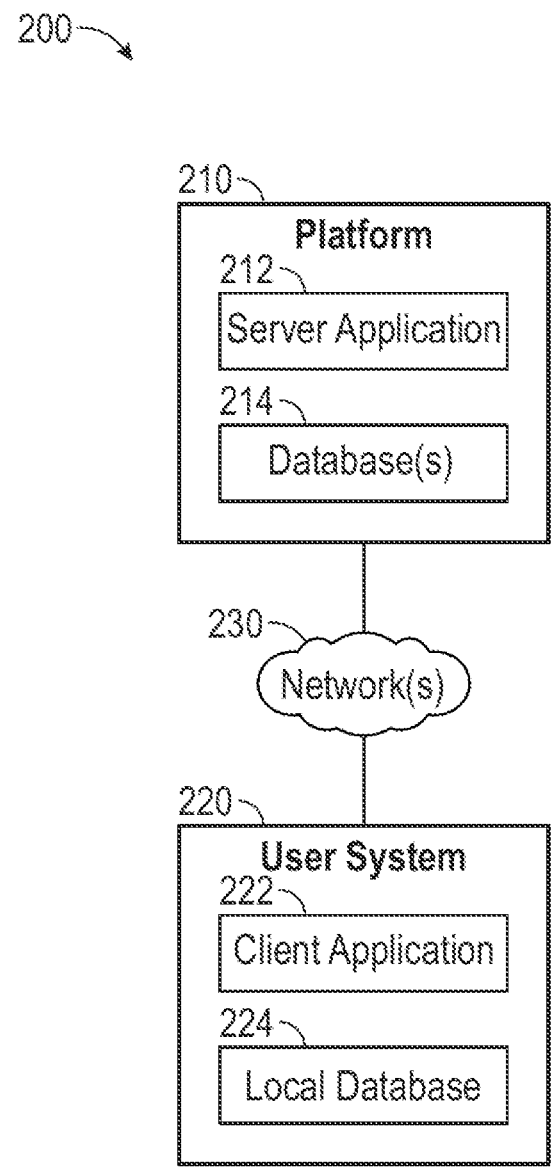
FIG. 2 illustrates an example infrastructure in which one or more of the processes described may be implemented, in accordance with various aspects of the present disclosure.

FIG. 2 illustrates an example infrastructure 200 in which one or more of the disclosed processes may be implemented, according to an embodiment. The infrastructure 200 may comprise a platform 210 (e.g., one or more servers) that hosts and/or executes one or more of the various functions, processes, methods, and/or software modules described herein. The platform 210 may comprise dedicated servers, or may instead comprise cloud instances, which utilize shared resources of one or more servers. These servers or cloud instances may be collocated and/or geographically distributed. The platform 210 may also comprise or be communicatively connected to a server application 212 and/or one or more databases 214. In addition, the platform 210 may be communicatively connected to a user system 220 via a network 230. While only a single instance of the user system 220 is illustrated in the example of FIG. 2, other example infrastructures may comprise any number of user systems that are communicatively coupled to the platform 210 via the network 230.

The network 230 may include the Internet, and the platform 210 may communicate with the user system 220 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While the platform 210 is illustrated as being connected to various systems through a single set of the network 230, in other examples, the platform 210 may be connected to the various systems via different sets of one or more networks. For example, the platform 210 may be connected to a first subset of user systems via the Internet, but may be connected to a second subset of user systems via an intranet. It should be appreciated that the first subset and the second subset may include any suitable quantity of user systems that overlap, such as zero, one, two, etc. user systems.

Each user system 220 may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that each user system 220 includes a VR stand-alone headset including a head mountable display device and at least one hand controller, as described in connection with an example head mountable display system 300 of FIG. 3. Different users with different roles will utilize their particular user system to interact with the server application 212 on the platform 210 in accordance with their individual roles. For example, an operator may utilize an operator user system, and an administer may utilize an administer user system. An operator user system may enable an operator to access a training session for guided training of a machine and/or to receive an assessment on their performance, as described herein. An administer user system may enable the administer to access training sessions and/or assessments of operators who complete the training sessions.

As shown in FIG. 2, the user system 220 may comprise or be communicatively connected to a client application 222 and/or one or more local databases 224. The client application 222 may include an operator training application configured to provide machine walk around, machine operation, and application training.

The platform 210 may include web servers that host one or more websites and/or web services. In embodiments in which a website is provided, the website may comprise a graphical user interface, including, for example, one or more screens (e.g., webpages) generated in HyperText Markup Language (HTML) or other language. The platform 210 transmits or serves one or more screens of the graphical user interface, which may be generated by the server application 212, in response to requests from the user system 220. In some embodiments, these screens may be served in the form of a wizard, in which case two or more screens may be served in a sequential manner, and one or more of the sequential screens may depend on an interaction of the user or the user system 220 with one or more preceding screens. The requests to the platform 210 and the responses from the platform 210, including the screens of the graphical user interface, may both be communicated through the network 230, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., the one or more databases 214) that are locally and/or remotely accessible to the platform 210.

As mentioned above, the platform 210 may comprise, be communicatively coupled with, or otherwise have access to the one or more databases 214. For example, the platform 210 may comprise one or more database servers that manage the one or more databases 214. The server application 212 executing on the platform 210, and/or the client application 222 executing on the user system 220, may submit data (e.g., user data, form data, any of the user input or other data described herein, etc.) to be stored in the one or more databases 214, and/or request access to data stored in the one or more databases 214. Any suitable database may be utilized, including without limitation MySQL™, Oracle™, IBM™, Microsoft SQL™, Access™, PostgreSQL™, and the like, including cloud-based databases and proprietary databases. Data may be sent to the platform 210, for instance, using the well-known POST request supported by HTTP, via FTP, and/or the like. This data, as well as other requests, may be handled, for example, by server-side web technology, such as a servlet or other software module (e.g., comprised in the server application 212), executed by the platform 210.

In embodiments in which a web service is provided, the platform 210 may receive requests from external systems, and provide responses in eXtensible Markup Language (XML), JavaScript Object Notation (JSON), and/or any other suitable or desired format. In such embodiments, the platform 210 may provide an application programming interface (API) which defines the manner in which the user system 220 and/or other external system(s) may interact with the web service. Thus, the user system 220 and/or the other external systems (which may themselves be servers), can define their own user interfaces, and rely on the web service to implement or otherwise provide the backend processes, methods, functionality, storage, and/or the like, described herein. For example, in such an embodiment, the client application 222, executing on the user system 220, may interact with the server application 212 to execute one or more or a portion of one or more of the various functions, processes, methods, and/or software modules described herein. In this case, the client application 222 may generate the graphical user interface. In an embodiment, the client application 222 may utilize the one or more local databases 224 for storing data locally on the user system 220.

The client application 222 may be "thin," in which date processing is primarily carried out server-side by the server application 212 on the platform 210. A basic example of a "thin" client application 222 is a browser application, which simply requests, receives, and renders webpages at the user system 220, while the server application 212 on the platform 210 is responsible for generating the webpages and managing database functions. Alternatively, the client application may be "thick," in which case processing is primarily carried out client-side by the user system 220. It should be understood that the client application 222 may perform an amount of processing, relative to the server application 212 on the platform 210, at any point along this spectrum between "thin" and "thick," depending on the design goals of the particular implementation. In any case, the software described herein, which may wholly reside on either the platform 210 (e.g., in which case the server application 212 performs all processing) or the user system 220 (e.g., in which case the client application 222 performs all processing) or be distributed between the platform 210 and the user system 220 (e.g., in which case the server application 212 and the client application 222 both perform processing), can include one or more executable software modules comprising instructions that implement one or more of the processes, methods, or functions described herein.

In some examples in which the user system 220 and the client application 222 have the capability to perform the processing at the user system 220, the user system 220 may be referred to as a "tether-less" system. In other examples in which the user system 220 and/or the client application 222 offload at least a portion of the processing to the server application 212, the user system 220 may be referred to as a "tethered" system.

To provide an operator with point of need training, the operator may be equipped with the user system 220, which may include a wearable system, such as a head mountable display system 300 of FIG. 3. Aspects of the head mountable display system 300 may be implemented via a virtual reality headset that can be deployed at a point of need (e.g., a jobsite, such as the example work site 100 of FIG. 1). In the illustrated example of FIG. 3, the head mountable display system 300 includes a head mountable display device 302 and hand controls 320. The head mountable display device 302 is configured to display graphical user interfaces on a display screen 304. The graphical user interfaces may include one or more virtual objects (e.g., graphical media content, such as text, images, and/or video) with which the operator may interact. In some examples, the display screen 304 may be implemented via a substantially transparent display screen. For example, a substantially transparent display screen may permit the operator to maintain a view of the physical environment while also viewing the virtual objects displayed over the physical field of vision of the operator to augment the image seen by the operator. Such augmented imagery may sometimes be referred to as augmented reality (AR) or augmented vision.

The head mountable display system 300 may include an adjustable strap or harness 306 that allows the head mountable display system 300 to be worn over the head of the operator. The head mountable display system 300 may include a visor or goggles 308 with lenses that function as the display screen 304. One or more image projectors 310 may direct the graphical user interfaces onto the display screen 304 within the line of sight of the operator.

The one or more image projectors 310 may be an optical projection system, light emitting diode package, optical fibers, or other suitable projector for transmitting a virtual object. The display screen 304 may be configured to reflect the virtual objects from the one or more image projectors 310, for example, by a thin film coating, tinting, polarization, or the like.

The head mountable display system 300 includes a headset controller 312 including a processor or other electronics. The headset controller 312 may transmit and receive data between the head mountable display device 302 and the hand controls 320. Additionally, the headset controller 312 may facilitate communication between the head mountable display system 300 and the platform 210 of FIG. 2. For example, the headset controller 312 may communicate data from the head mountable display system 300 to the platform 210 (e.g., to store in the one or more databases 214), and/or may communicate data from the platform 210 to the head mountable display system 300. The headset controller 312 may control the projection of the graphical user interfaces on the display screen 304 and determine the virtual objects to be projected by the one or more image projectors 310.

The hand controls 320 may include virtual reality hand controls. As shown in FIG. 3, the hand controls 320 include one or more navigation controls 322 that facilitate interacting with and navigating through the graphical user interfaces. For example, a first navigation control may enable the operator to select a virtual object, a second navigation control may enable the operator to return to a previous graphical user interface, a third navigation control may enable the operator to pause or stop an operator training application, etc. When the operator engages with one of the one or more navigation controls 322, the hand controls 320 transmit data that is received by the headset controller 312 for processing.

The head mountable display system 300 may also include a sensor system 330 used to determine an orientation and a position or pose of the head of the operator and the hand(s) of the operator. For example, the sensor system 330 may include one or more headset sensors 332 positioned on the head mountable display device 302 that generate signals that the headset controller 312 may use to determine the pose of the head of the operator. The sensor system 330 may also include one or more hand control sensors 334 positioned on the hand controls 320 that generate signals that the headset controller 312 may use to determine the position of the hand(s) of the operator. In some examples, the one or more headset sensors 332 and/or the one or more hand control sensors 334 may be implemented via Hall effect sensors that utilize the variable relative positions of a transducer and a magnetic field to deduce the direction, pitch, yaw, and/or roll of the head and/or the positioning of the hand(s) of the operator. In other examples, the one or more headset sensors 332 and/or the one or more hand control sensors 334 may communicate with a positioning system, such as a global navigation satellite system or a global positioning system, to determine the pose of the head and/or positioning of the hand(s) of the operator.

The data obtained by the one or more headset sensors 332 may be used to determine a specific orientation of the field of view of the operator relative to an operator station, such as the operator station 126 and/or the operator station 134 of FIG. 1. The data obtained by the one or more hand control sensors 334 may be used to facilitate interaction with images and/or virtual objects displayed via the display screen 304.

As described above, the head mountable display system 300 may be used to present graphical user interfaces to facilitate guided operator training, as presented herein. For example, the head mountable display system 300 may execute the client application 222 of FIG. 2 (e.g., a guided operator application) to facilitate training and assessing an operator on their use of a simulated machine. The client application 222 may guide the user (e.g., the operator or the administer) through a number of screens including graphical user interfaces. For example, and as described in connection with FIGS. 4 to 25, the display screen 304 may display a graphical user interface including one or more virtual objects that the operator may interact with via the one or more navigation controls 322 of the hand controls 320. Each of the virtual objects may be associated with unique identifiers, such as a set of coordinates (e.g., Cartesian coordinate data, polar coordinate data, or spherical coordinate data), that define a location of the virtual object relative to the graphical user interface. As the operator moves the hand controls 320, the one or more hand control sensors 334 may output data related to the positioning of the hands relative to the displayed graphical user interface. The headset controller 312 may use the unique identifiers associated with the different displayed virtual objects of the graphical user interface and the positioning data provided by the one or more hand control sensors 334 to determine when the operator is interacting with a specific virtual object.

As described above, in some examples, processing of data may be performed by the headset controller 312. In other examples, the headset controller 312 may offload a portion of the data processing to the server application 212 of the platform 210.

The headset controller 312 may execute a client application (e.g., the client application 222), such as a guided operator application that includes a plurality of graphical user interfaces to guide a user through different screens of the guided operator application.

The graphical user interfaces may be associated with an operator training application that provides a machine walk around, machine operation and application training, and learning assessments to the operator and/or administrators. For example, the graphical user interfaces associated a machine walk around may provide training related to different aspects of a machine, such as an asphalt compactor. The graphical user interfaces associated with the machine operation and application training may provide training related to, for example, asphalt compactor rolling pattern scenarios, paving-by-numbers scenarios, milling-by-numbers scenarios, etc. The graphical user interfaces associated with the learning assessments may provide a score assessment and/or feedback related to operation of the machine by the operator via the operator training application.

FIGS. 4 to 25 are pictorial illustrations of exemplary disclosed graphical user interfaces (GUIs) that may be generated by the user system 220 of FIG. 2 and/or the head mountable display system 300 of FIG. 3 to facilitate guided operator training, as presented herein. The respective GUIs may be presented based on different training tasks and/or based on input received from the operator (e.g., via the one or more navigation controls 322 of the hand controls 320). For example, the headset controller 312 may generate a GUI to present to the operator based on which training task the operator is performing and/or based on one or more inputs received from the operator. It may be appreciated that the different GUIs are merely illustrative and that other examples may include additional or alternate GUIs and/or flows between GUIs.

Figure 4:
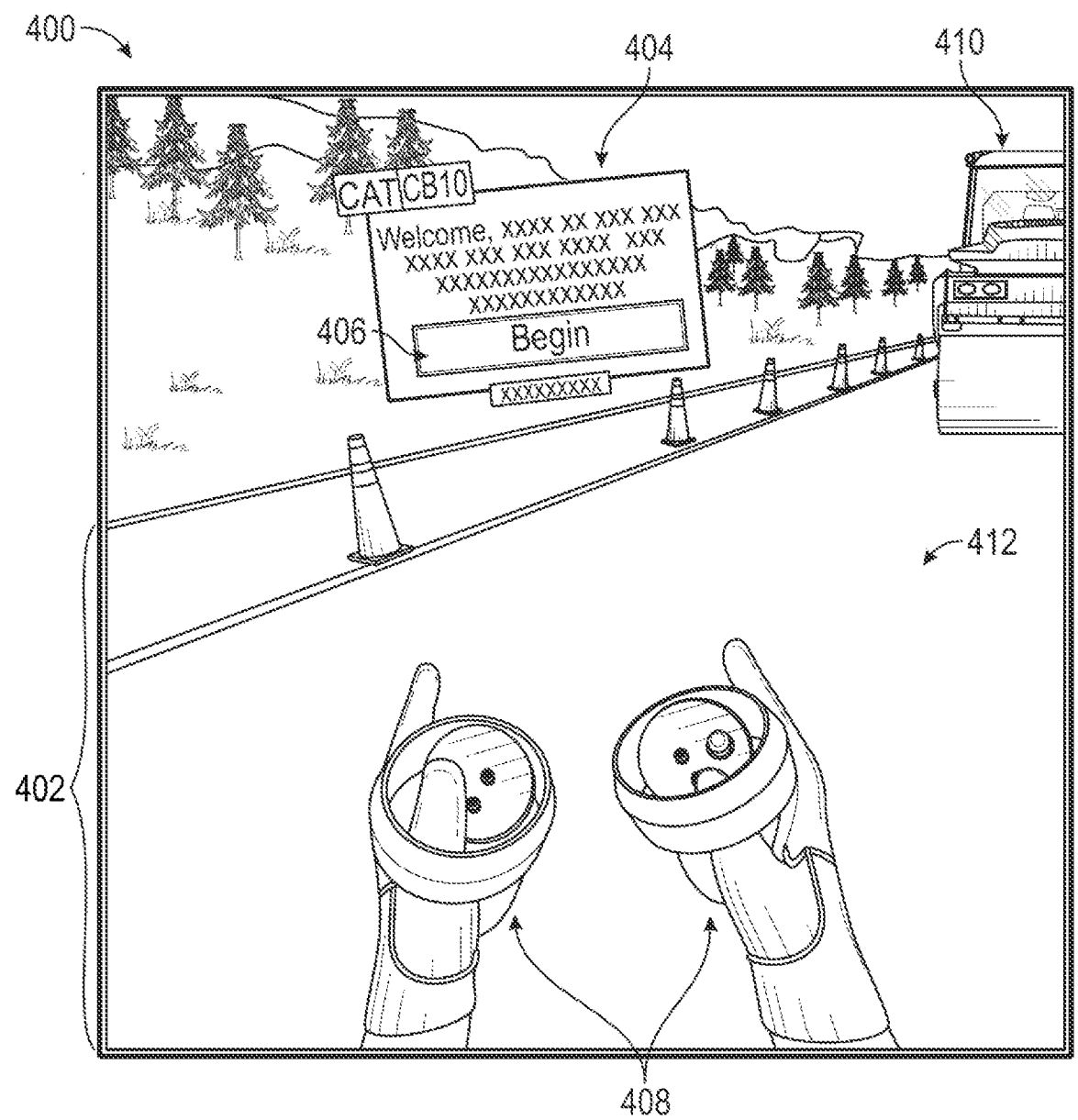

FIG. 4 illustrates a GUI 400 that illustrates a portion of a work site 402, such as the example work site 100 of FIG. 1. The GUI 400 may include a plurality of virtual objects that introduce the operator to the operator training application. For example, the GUI 400 may include a menu 404 that provides information related to the operator training application. The menu 404 also includes a selectable virtual object 406 that the operator may select (e.g., via the one or more navigation controls 322 of the hand controls 320) to start the operator training application. The GUI 400 may also include one or more virtual objects that enable the operator to become familiar with using the head mountable display system 300 and the operator training application. For example, the GUI 400 includes virtual controllers 408 illustrating positioning of the hands of the operator relative to other virtual objects of the GUI 400. The virtual controllers 408 may be a virtual representation of the hand controls 320 and include virtual representations of the one or more navigation controls 322. The virtual controllers 408 may allow an operator to become familiar with using the one or more navigation controls 322 while using the operator training application. For example, when using the head mountable display system 300, the operator may be unable to see the one or more navigation controls 322 of the hand controls 320 in their hand (e.g., due to the head mountable display device 302). The virtual controllers 408 may provide a virtual representation of the hand controls 320 and the one or more navigation controls 322 so that the operator is able to learn the impact moving the hand controls 320 has in relation to virtual objects of the GUI, how to access the one or more navigation controls 322 without being able to see the one or more navigation controls 322, etc. The displaying of the virtual controllers 408 may be enabled or disabled at different times while using the operator training application, as described in connection with FIGS. 5A and 7.

Additionally, as the operator moves their head (e.g., from left to right, down to up, etc.), aspects of the GUI 400 may update to display different virtual objects. For example, based on data obtained from the one or more headset sensors 332, the headset controller 312 may update the displayed portion of the work site 402. For example, the GUI 400 includes a portion of a machine 410 (e.g., an asphalt compactor) on a work surface 412 of the work site 402. As the operator moves their head to the right, more of the machine 410 may become visible to the operator as the headset controller 312 updates the displayed portion of the work site 402 based on the data obtained from the one or more headset sensors 332.

FIG. 5A illustrates a GUI 500 that illustrates a login screen that the operator may use to access their profile (or account). As shown in FIG. 5A, the GUI 500 includes a supervisor 502 who may guide the operator through their use of the operator training application. The GUI 500 also includes a first virtual object 504 that indicates that the operator training application is configured for training related to an "Asphalt Compactor" and a second virtual object 506 that is a selectable virtual object to enable the operator to login or access their profile, as described in connection with FIGS. 5B and 5C.

The GUI 500 also includes a third virtual object 508 that is a selectable virtual object to toggle (e.g., enable or disable) a "Hand Helpers" setting while the operator is using the operator training application. When the Hand Helpers setting is enabled (e.g., the third virtual object 508 is selected or a check mark is present, as shown in the example of FIG. 5A), virtual controllers, such as the virtual controllers 408 of FIG. 4, may be displayed on the different GUIs. The virtual controllers 408 may be displayed to help guide the operator with hand movements and to become familiar with the headset controller 312. When the Hand Helpers setting is enabled, the operator is able to see the virtual controllers 408. When the Hand Helpers setting is disabled (e.g., the third virtual object 508 is not selected), the operator the operator is unable to see the virtual controllers 408. In some examples, the Hand Helpers setting may be enabled when an operator executes the operator training application for a first time or when the operator executes the operator training application for a first time for a particular machine.

In the illustrated example of FIG. 5A, the operator may select the second virtual object 506 to perform a login procedure. For example, selecting the second virtual object 506 may cause the headset controller 312 to display a login menu 510 of FIG. 5B including selectable virtual objects to enable the operator to login as a new user or as an existing user. As shown in FIG. 5B, the login menu 510 includes a first virtual object 512 ("New User") and a second virtual object 514 ("Existing User"). When the operator selects the first virtual object 512, the operator may be prompted to register a new profile by providing new user information, such as a user name, a first name, a last name, a password, etc. In some examples, after completing the prompts to register the new profile, the operator may be provided one or more GUIs to enable the operator to become familiar with the operator training application, such as a walkthrough of the operator training application, a walkthrough of the virtual controllers 408, a walkthrough of interacting with virtual objects of a GUI, etc.

When the operator has previously registered a profile with the operator training application, the operator may select the second virtual object 514 of the login menu 510 to select an existing profile. For example, selecting the second virtual object 514 may cause the headset controller 312 to display a profile selection menu 520 of FIG. 5C including selectable virtual objects to enable the operator to select an existing profile. The profile selection menu 520 ("Choose Profile") may include one or more selectable virtual objects corresponding to different profiles. As shown in FIG. 5C, the profile selection menu 520 includes a first profile "admin" that may be associated with an administrator or a supervisor, and a second profile "User1" that may be associated with an operator. After selecting one of the displayed profiles, the operator may select a first virtual object 522 ("Login") to complete the login process associated with the selected profile. In other examples, the operator may select a second virtual object 524 ("Back") to return to a previous menu, such as the example login menu 510 of FIG. 5B.

Figure 6:
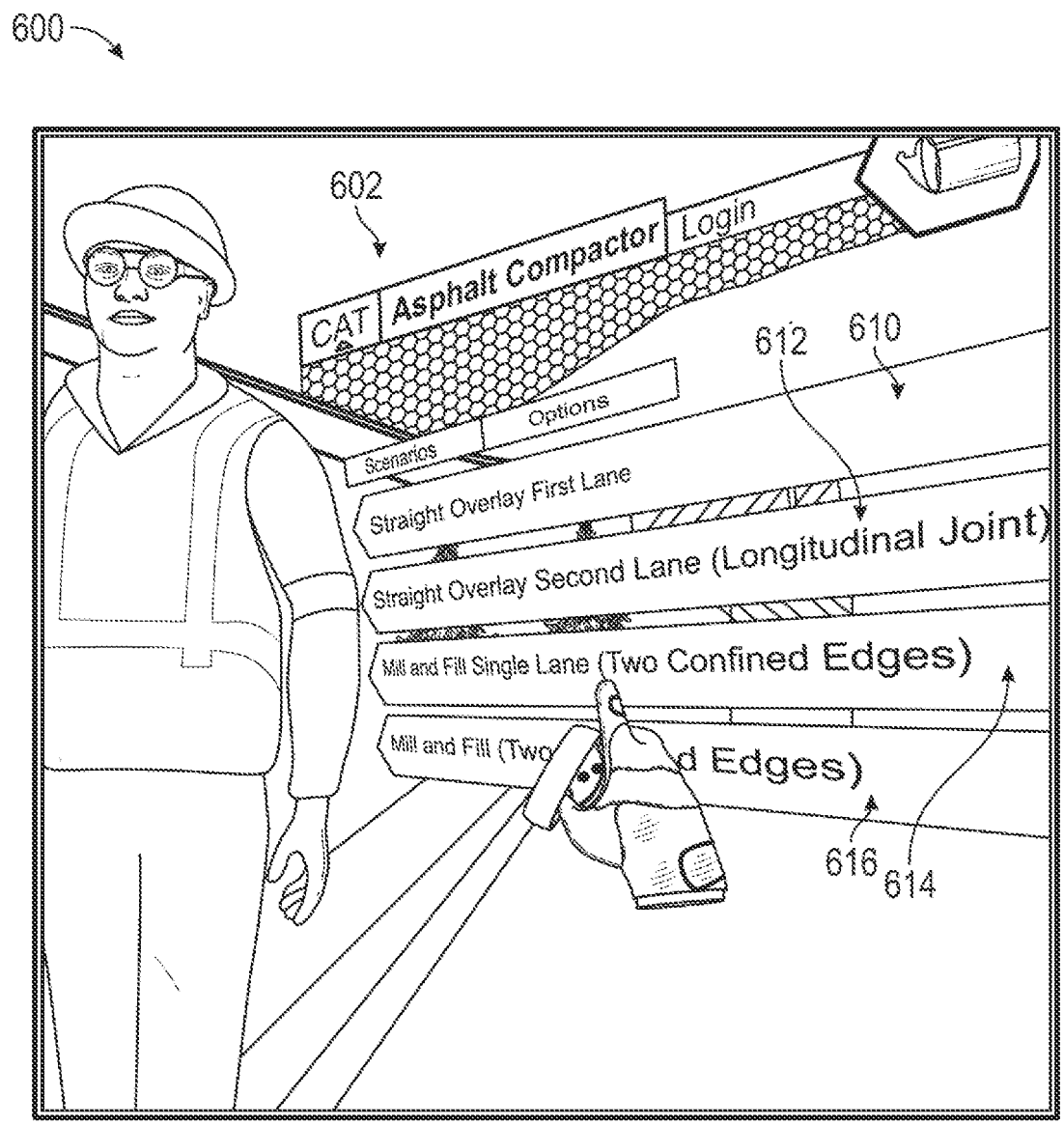

FIG. 6 illustrates a GUI 600 that includes a scenario selection menu 602 displaying different scenarios that an operator may select for training purposes. For example, a first virtual object 610 may be selected to perform a "Straight Overlay First Lane" training scenario, a second virtual object 612 may be selected to perform a "Straight Overlay Second Lane (Longitudinal Joint)" training scenario, a third virtual object 614 may be selected to perform a "Mill and Fill Single Lane (Two Confined Edges)" training scenario, or a fourth virtual object 616 may be selected to perform a "Mill and Fill (Two Unconfined Edges)" training program. In the example of FIG. 6, the operator selects the third virtual object 614 to perform the "Mill and Fill Single Lane (Two Confined Edges)" training scenario.

Figure 7:
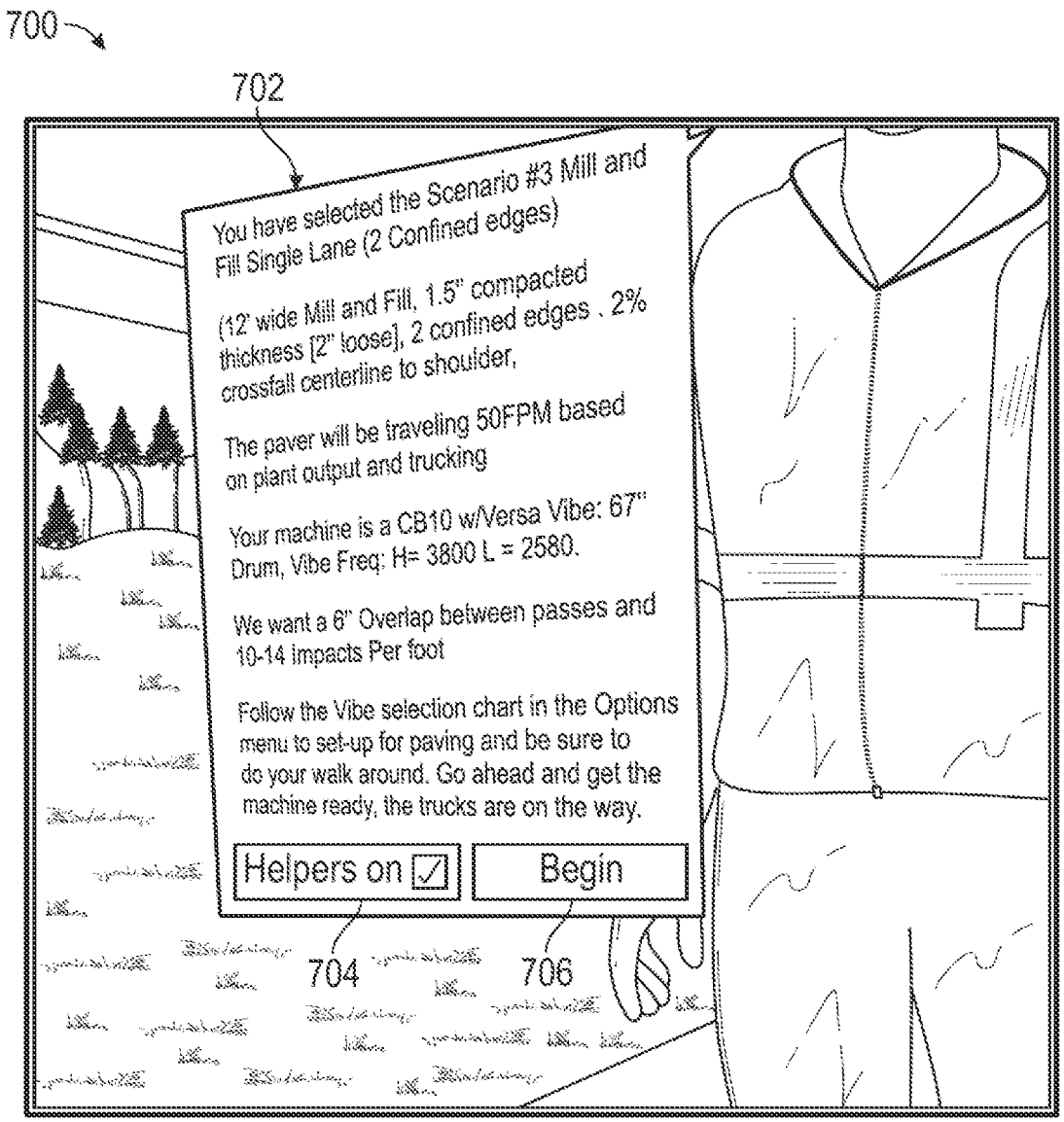

FIG. 7 illustrates a GUI 700 that includes a first virtual object 702 describing a specification for a job and settings for the machine 710. For example, the first virtual object 702 describes a specification for the "Mill and Fill Single Lange (Two Confined Edges)" training scenario of FIG. 6. The first virtual object 702 may indicate an overlay width, a compacted thickness, a quantity of unconfined edges, a traveling speed of the machine, and/or characteristics of the machine, such as a drum size, amplitude setting, vibration frequency, etc. As shown in FIG. 7, the GUI 700 includes a second virtual object 704 that is a selectable virtual object to toggle a Helpers setting and a third virtual object 706 to begin tasks related to the job and the machine.

In the illustrated example of FIG. 7, the second virtual object 704 is a selectable virtual object to enable or disable Helpers within a scenario. The Helper guides or trains the operator in the environment. When the Helpers setting is enabled (e.g., via a check mark in the illustrated example of FIG. 7), the operator training application displays a path for the operator to follow, for example, when performing a rolling pattern. The operator training application may also display pre-setup items, such as an amplitude selection wheel, to guide or train the operator prior to performing the rolling pattern. For example, the operator training application may display the current setting of the amplitude selection wheel and at what position (e.g., high or low) to set the amplitude selection wheel. Additionally, after the operator "sits" in the operator station of the machine 410, the operator training application may guide the operator to button settings, such as a vibe settings button, a water spray timer button, an automatic speed control button, an impact spacing button, etc.

In some examples, when the Helpers setting is enabled, the operator receives guidance while performing the scenario. The operator may also receive feedback at the conclusion of the scenario. For example, and as described in connection with FIGS. 18 to 20 and FIGS. 23 to 26, the operator may receive an assessment after completing a scenario. In some examples, the assessment may include a score assessment and/or feedback. For example, the assessment may include a score assessment and feedback when the Helpers setting is disabled, and the assessment may include feedback or a score assessment when the Helpers setting is enabled. However, other examples may include additional or alternate information when providing an assessment based on execution of the operator training application.

Figure 8:
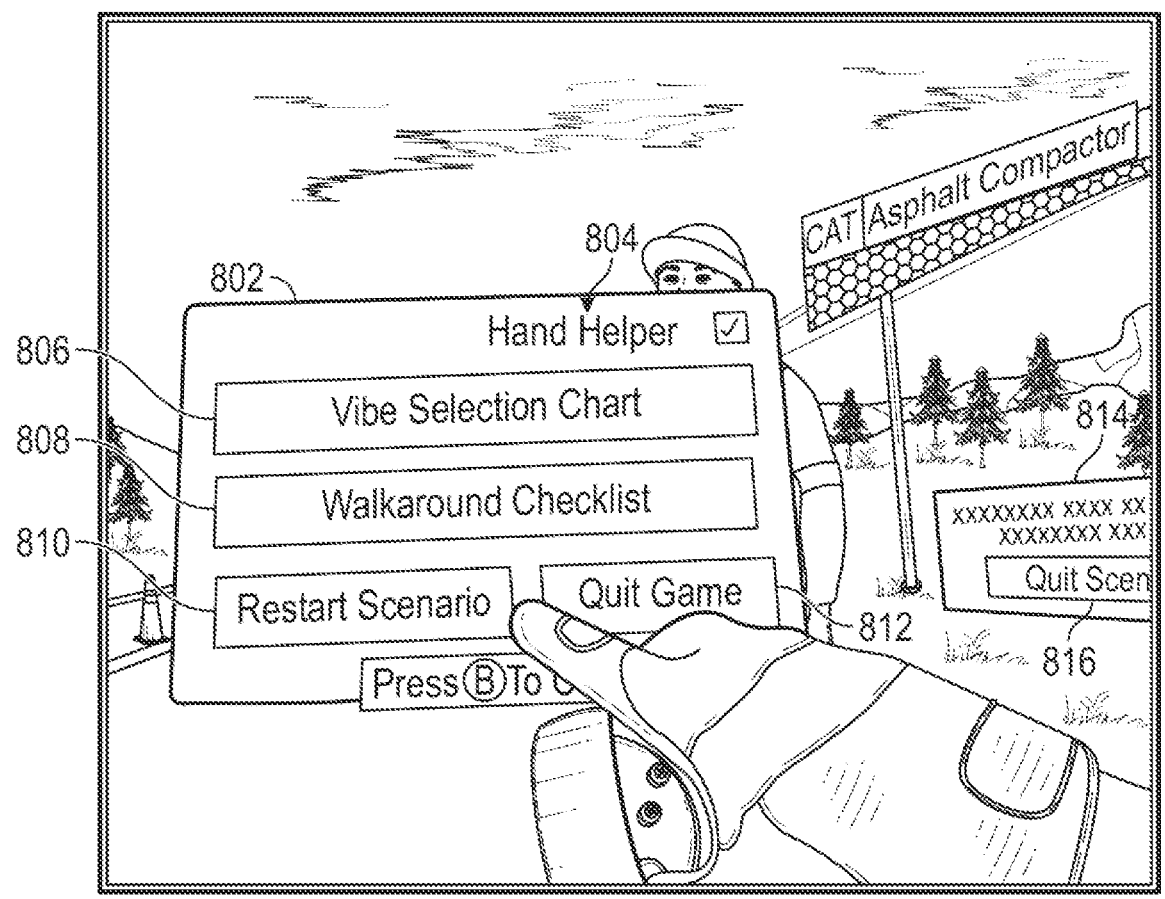

FIG. 8 illustrates a GUI 800 that includes a first pop-up menu 802 including a plurality of selectable virtual objects. For example, the first pop-up menu 802 includes one or more tasks that may be performed by an operator related to a scenario. A scenario may include one or more tasks associated with a particular job specification, as described in connection with the GUI 600 of FIG. 6 and the GUI 700 of FIG. 7. For example, a first scenario may include training related to asphalt compactor rolling patterns, a second scenario may include training related to paving-by-numbers, and a third scenario may include training related to milling-by-numbers. Completing a scenario may include setting operating parameters of the machine 410 (e.g., an amplitude setting, a vibration setting, etc.) and performing a machine walkaround to confirm that the machine 410 is in operating condition. The scenario may also include a walkaround of the machine 410 to become familiar with the machine. In some examples, the operator may cause the first pop-up menu 802 to be displayed while performing a training scenario by selecting a button on the one or more navigation controls 322 of the hand controls 320.

As shown in FIG. 8, the first pop-up menu 802 includes a first virtual object 804 that is a selectable virtual object and indicates the status of the Hand Helper setting. The first pop-up menu 802 also includes a second virtual object 806 ("Vibe Selection Chart") and a third virtual object 808 ("Walkaround Checklist") that are selectable virtual objects and enable the operator to view different aspects related to a current scenario. For example, the operator may select the second virtual object 806 to review the Vibe Selection Chart to facilitate successfully completing a task. The operator may select the third virtual object 808 to review a Walkaround Checklist. The first pop-up menu 802 also includes a fourth virtual object 810 and a fifth virtual object 812 that are selectable virtual objects and are related to navigation within a scenario. The operator may select the fourth virtual object 810 to restart the current scenario (or job). For example, the operator may be performing the first scenario and determine to restart the training of the asphalt compactor rolling patterns and, thus, select the fourth virtual object 810 to restart the scenario. The operator may select the fifth virtual object 812 to exit the operator training application (e.g., "Quit Game").

As shown in FIG. 8, the GUI 800 also includes a second pop-up menu 814 including a sixth virtual object 816 that is a selectable virtual object and enables the operator to exit the scenario (e.g., "Quit Scenario"). The operator may select the sixth virtual object 816 to continue the operator training application, but to try a different scenario (or job). For example, the operator may select the sixth virtual object 816 to switch from the first scenario to the second scenario, for example, to train for paving-by-numbers.

Figure 9:
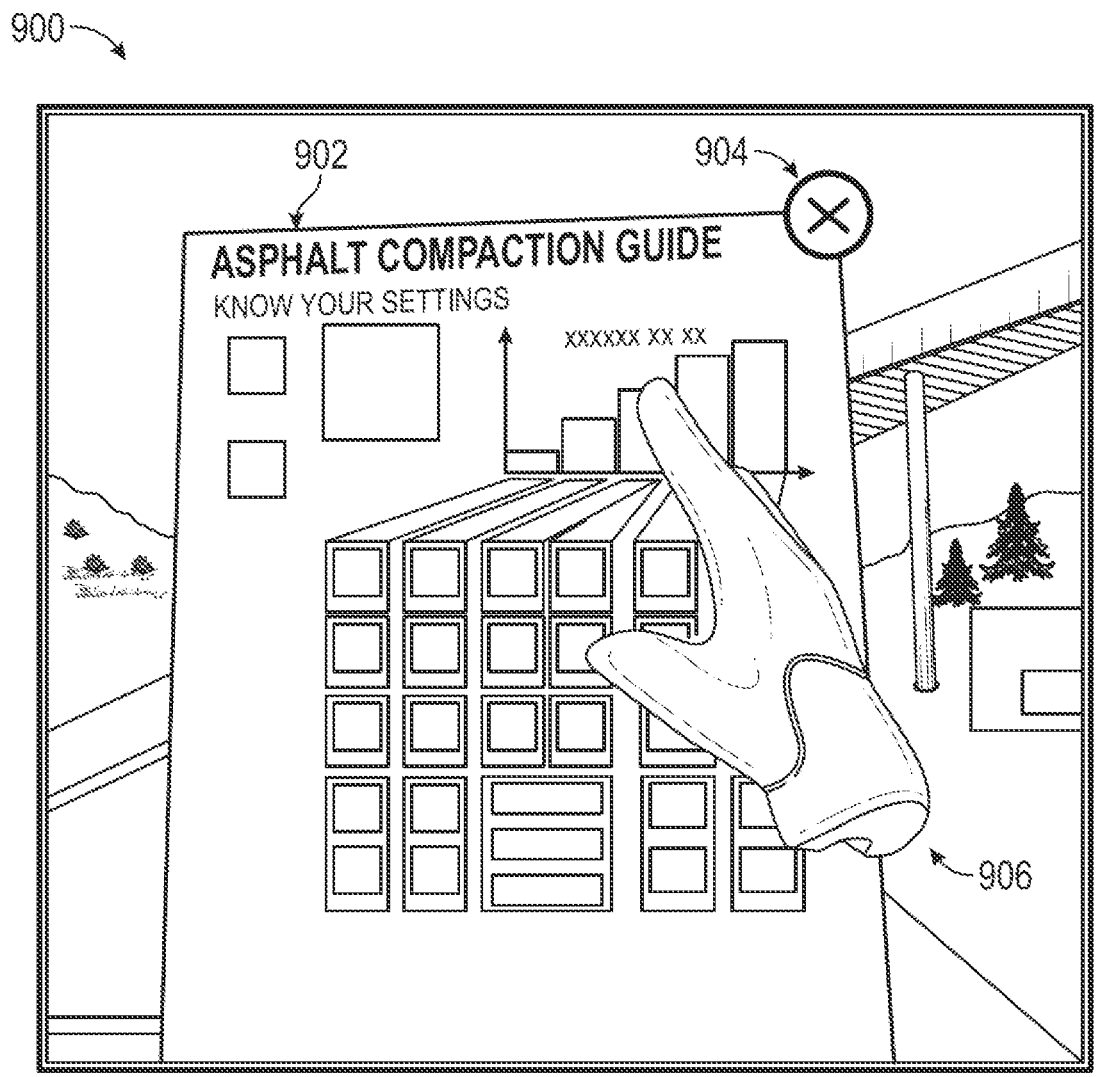
Figure 10:
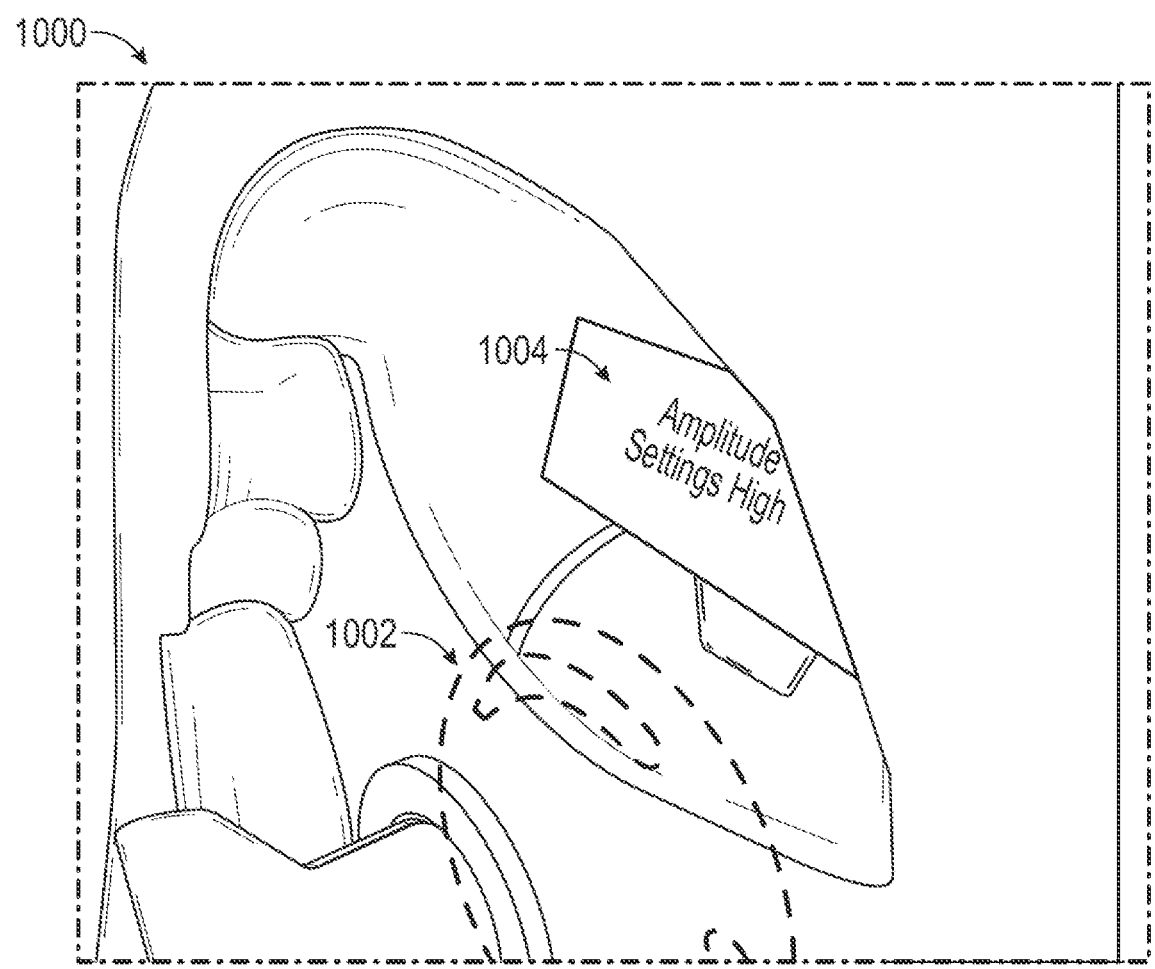

FIG. 9 and FIG. 10 illustrate GUIs related to the Vibe Selection Chart (e.g., after selecting the second virtual object 806 of FIG. 8). FIG. 9 illustrates a GUI 900 including a pop-up menu 902 and a virtual object 904. The pop-up menu 902 may be presented to the operator to indicate different amplitude settings that may be selected based on one or more parameters associated with the scenario. For example, based on the different parameters provided in the job description and the characteristics of the machine 410, different amplitude settings may be selected to complete the job. The virtual object 904 is a selectable virtual object that enables the operator to close the Vibe Selection Chart and to return to the previous GUI (e.g., to close the pop-up menu 902). In the example of FIG. 9, as the operator moves their hands using the hand controls 320, a graphical representation 906 of their hand may move across the GUI to indicate a position relative to other virtual objects of the GUI, for example, when the Hand Helpers setting is enabled, as described in connection with the third virtual object 508 of FIG. 5.

FIG. 10 illustrates a GUI 1000 that may be presented to enable the operator to select an amplitude setting. For example, the GUI 1000 includes an example amplitude selection wheel 1002 that is a selectable virtual object. The operator may interact with the amplitude selection wheel 1002 to select a desired amplitude setting. For example, the operator may move their hands to engage the amplitude selection wheel 1002 and to select a desired amplitude setting. As the operator moves their hands, the GUI 1000 may update to show their hands "grabbing" the amplitude selection wheel 1002 and rotating the amplitude selection wheel 1002 until the desired amplitude setting is selected. The selected amplitude setting may adjust the amplitude of the vibratory system of the machine 410. A virtual object 1004 may indicate the currently selected amplitude setting.

Figure 11:
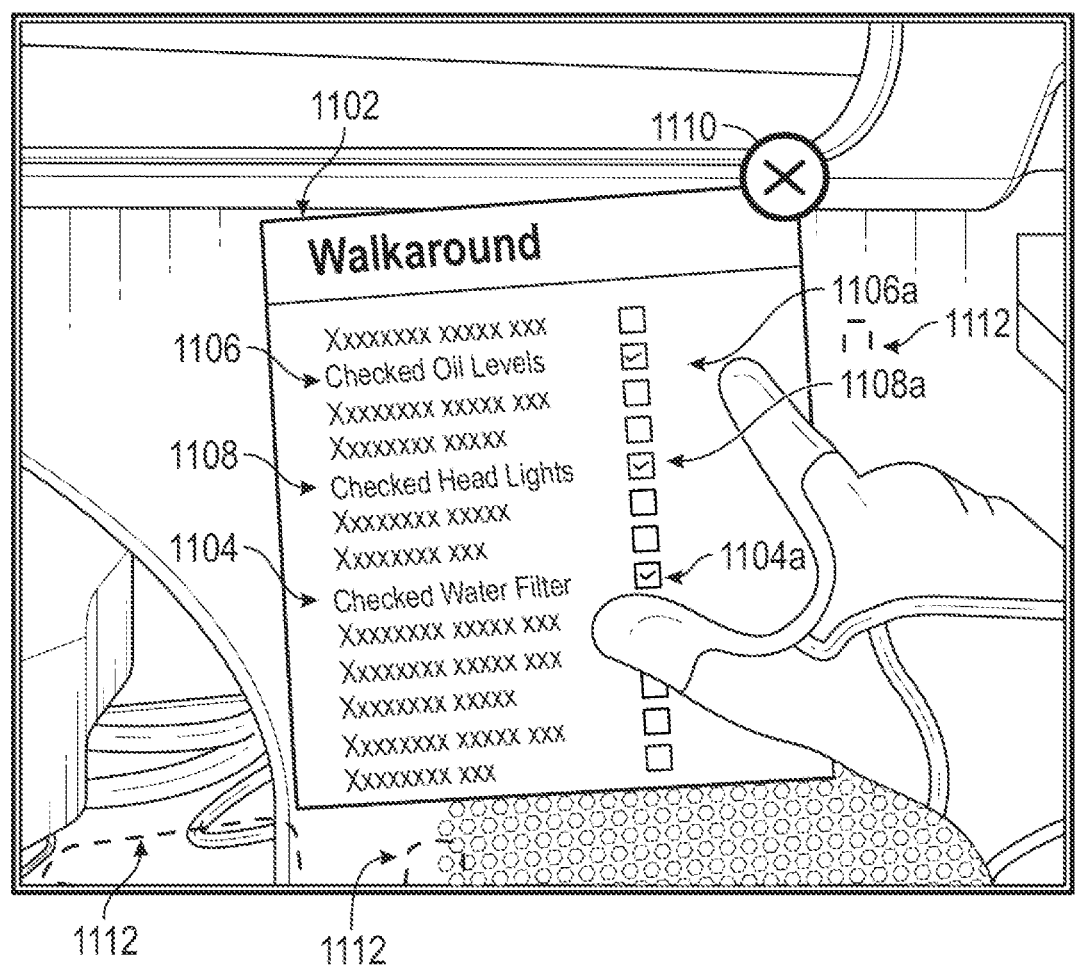
Figure 12:
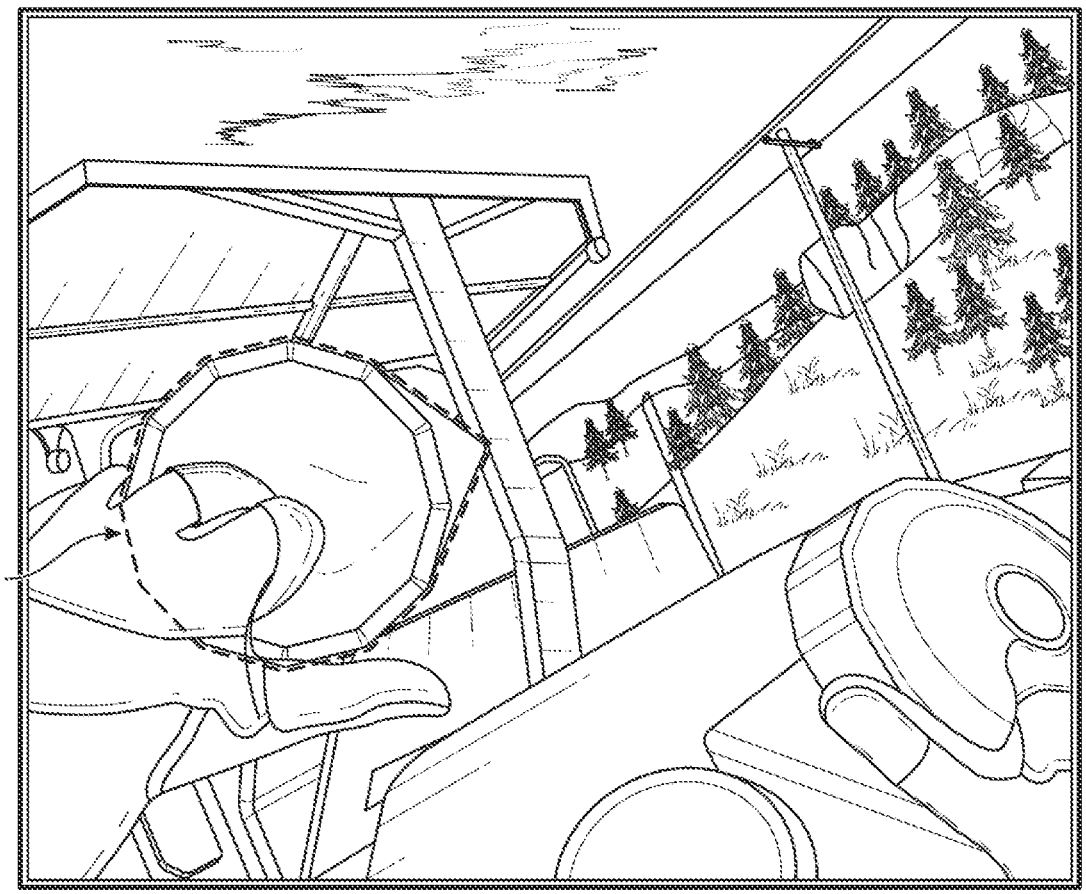
Figure 13:
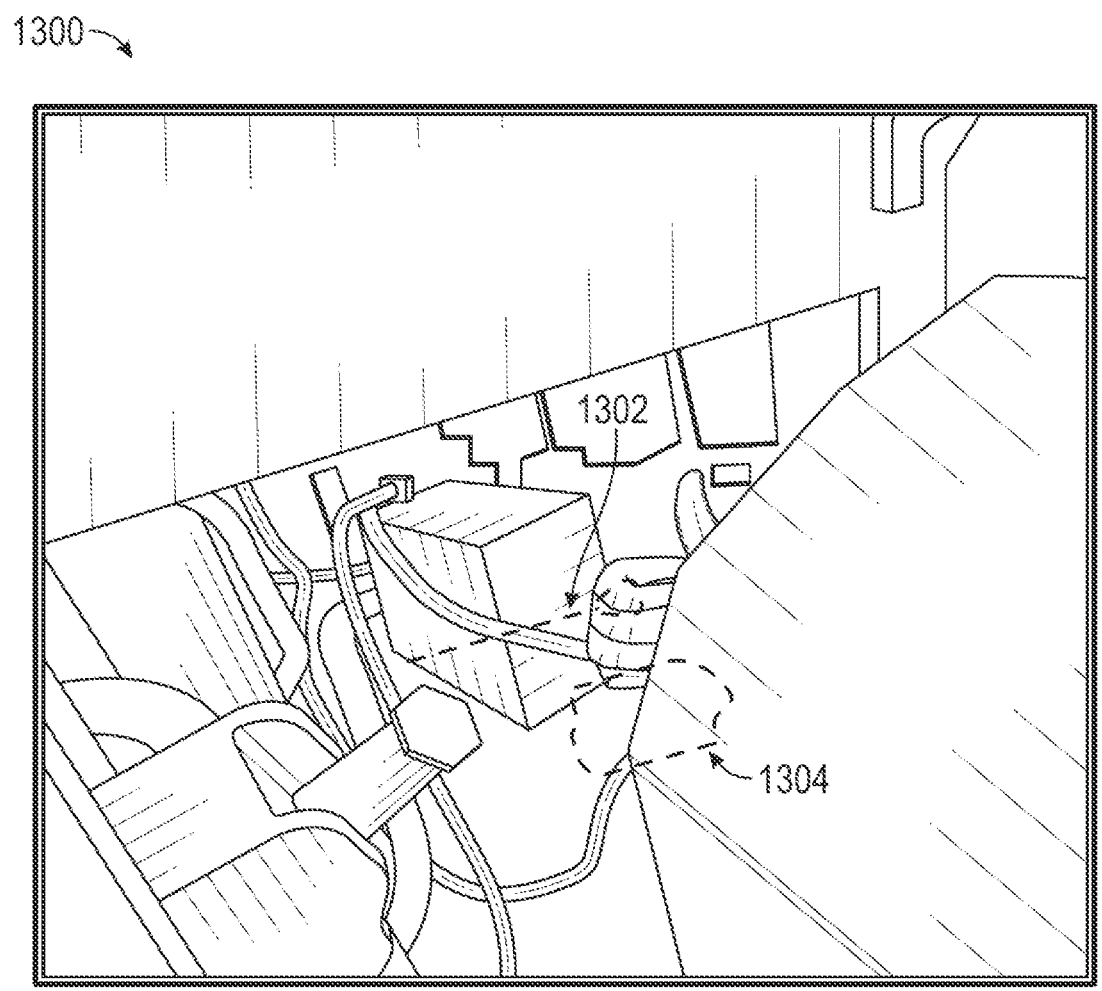

FIG. 11, FIG. 12, and FIG. 13 illustrate example GUIs related to a Walkaround Checklist related to the scenario (e.g., after selecting the third virtual object 808 of FIG. 8). For example, FIG. 11 illustrates a GUI 1100 that includes a checklist 1102 including a plurality of tasks to train the operator to perform before operating the machine 410. For example, the checklist 1102 may include one or more tasks related to confirming that the machine 410 is in operating condition. As the operator performs a task, the checklist 1102 may be updated to indicate that the respective task is completed. For example, the checklist 1102 includes a first task 1104 related to a water filter ("Checked Water Filter"), a second task 1106 related to an oil dip stick ("Checked Oil Level"), and a third task 1108 related to front lights of the machine ("Checked Front Lights"). After the operator completes a task, the operator training application may update the checklist 1102 to indicate that the performing of the respective task is complete.

For example, the operator may determine to perform the first task and check the water filter. FIG. 12 illustrates a GUI 1200 that simulates the operator checking a water filter 1202. Based on movements of the operator, the sensor system 330 of the head mountable display system 300 may determine that the operator has moved themselves in front of the water filter 1202. Accordingly, the headset controller 312 may display the GUI 1200 and enable the operator to simulate accessing and checking the water filter 1202 of the machine 410.

FIG. 13 illustrates a GUI 1300 that simulates the operator checking oil levels of the machine 410. Based on movements of the operator, the sensor system 330 of the head mountable display system 300 may determine that the operator has moved themselves in front of an oil dip stick 1302. Accordingly, the headset controller 312 may display the GUI 1300 and enable the operator to simulate accessing the oil dip stick 1302 and checking the oil levels of the machine 410.

After performing a task and confirming that the respective aspect of the machine 410 is in operating condition, the checklist 1102 indicates that the respective task is complete. For example, returning to the example checklist 1102 of FIG. 11, after checking the water filter 1202 and determining that the water filter 1202 is in operating condition, the operator training application may determine that the first task 1104 is complete and a first task indicator 1104a of the checklist 1102 may update to indicate that the performing of the first task 1104 is complete. In a similar manner, after checking the oil dip stick 1302 and determining that the oil levels of the machine 410 are in operating condition, the operator training application may determine that the second task 1106 is complete and a second task indicator 1106a of the checklist 1102 may update to indicate that the performing of the second task 1106 is complete. As shown in FIG. 11, the first task indicator 1104a and the second task indicator 1106a are marked (e.g., include a "check" mark) and indicate that the first task 1104 and the second task 1106, respectively, are complete. In the illustrated example of FIG. 11, a third task indicator 1108a corresponding to the third task 1108 is not marked (e.g., is blank) and indicates that the performing of the third task 1108 is not complete. As shown in FIG. 11, when a task is complete, a corresponding indicator is marked (e.g., via a check mark in the example of FIG. 11), and when the task is incomplete, the corresponding indicator is blank. It may be appreciated that other examples may use additional or alternate techniques to indicate when a task is completed or incomplete.

Similar to the example of FIG. 9, the GUI 1100 of FIG. 11 includes a virtual object 1110 that is a selectable virtual object that enables the operator to exit the current task or to close the displayed menu. For example, the operator may move their hands to select the virtual object 1110 and to close the checklist 1102.

In the illustrated example of FIG. 11, FIG. 12, and FIG. 13, aspects of the respective GUIs include highlighted portions related to different parts of the machine 410. The different parts of the machine 410 may be highlighted to guide or train a new or novice operator. For example, the highlighted portions may guide the operator to different parts of the machine 410 related to the different tasks. The different parts of the machine 410 may be highlighted based on the field of view of the operator relative to the machine 410. For example, in FIG. 11, the GUI 1100 includes three different highlighted portions 1112 of the machine 410 corresponding to one or more of the tasks of the checklist 1102 and that are visible to the operator based on the current field of view of the operator. As the operator moves around the machine 410 to perform different tasks, the field of view of the operator changes and, thus, additional or alternate portions of the machine 410 may be highlighted. For example, as the operator moves to check the status of the water filter 1202 (e.g., as shown in FIG. 12), the field of view of the operator changes and the water filter 1202 is highlighted. As the operator moves to check the status of the oil levels (e.g., as shown in FIG. 13), the field of view of the operator changes and the oil dip stick 1302 and another portion 1304 of the machine 410 is highlighted.

In some examples, the walkaround screens of FIGS. 11 to 13 may be presented when a new or novice user accesses the operator training application. For example, when a new operator registers a profile (e.g., as described in connection with FIGS. 5A, 5B, and 5C), the new operator may be guided through the machine walkaround of FIGS. 11 to 13 to guide or train the new operator with different aspects of the machine 410.

Figure 14:
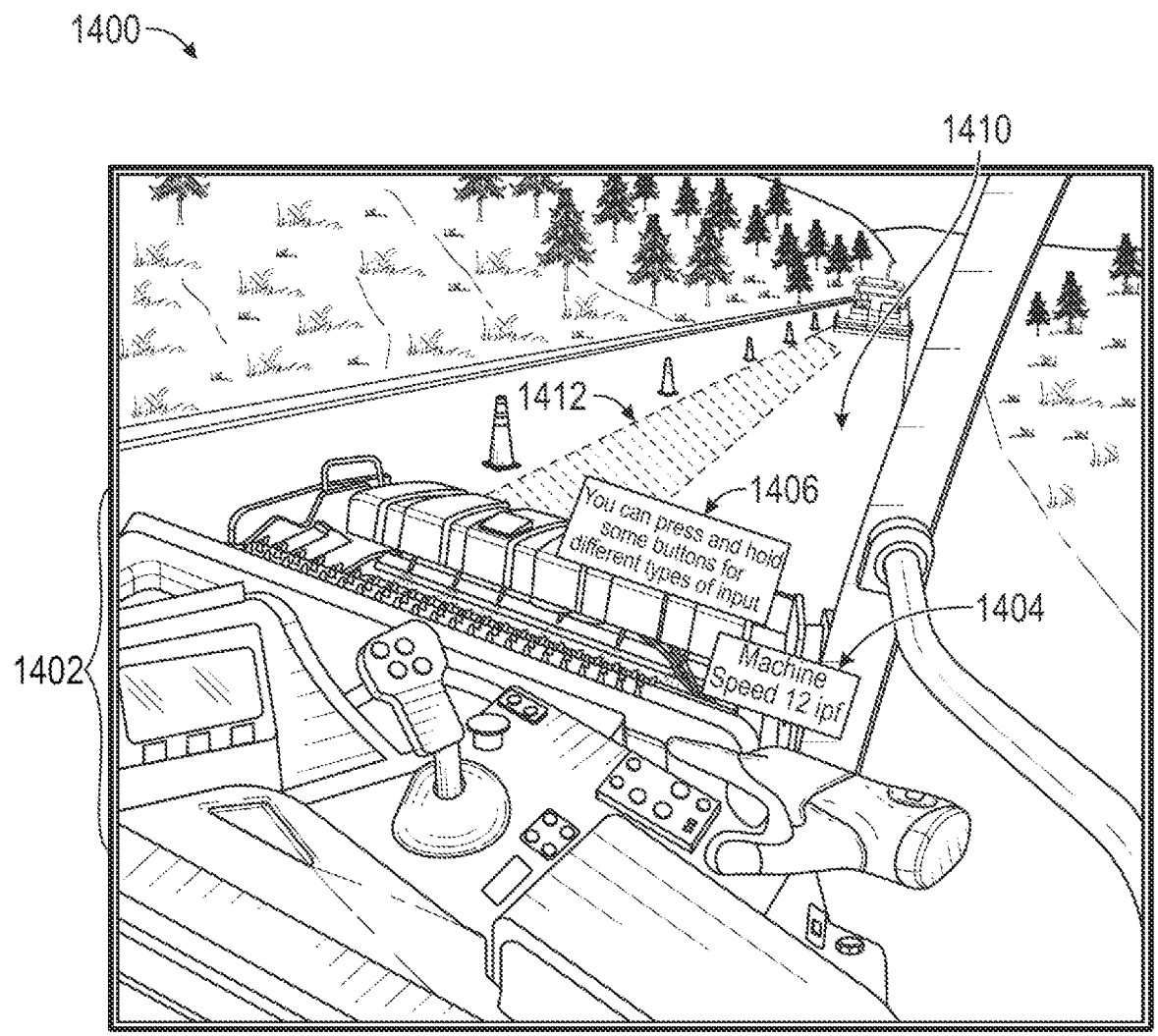
Figure 15:
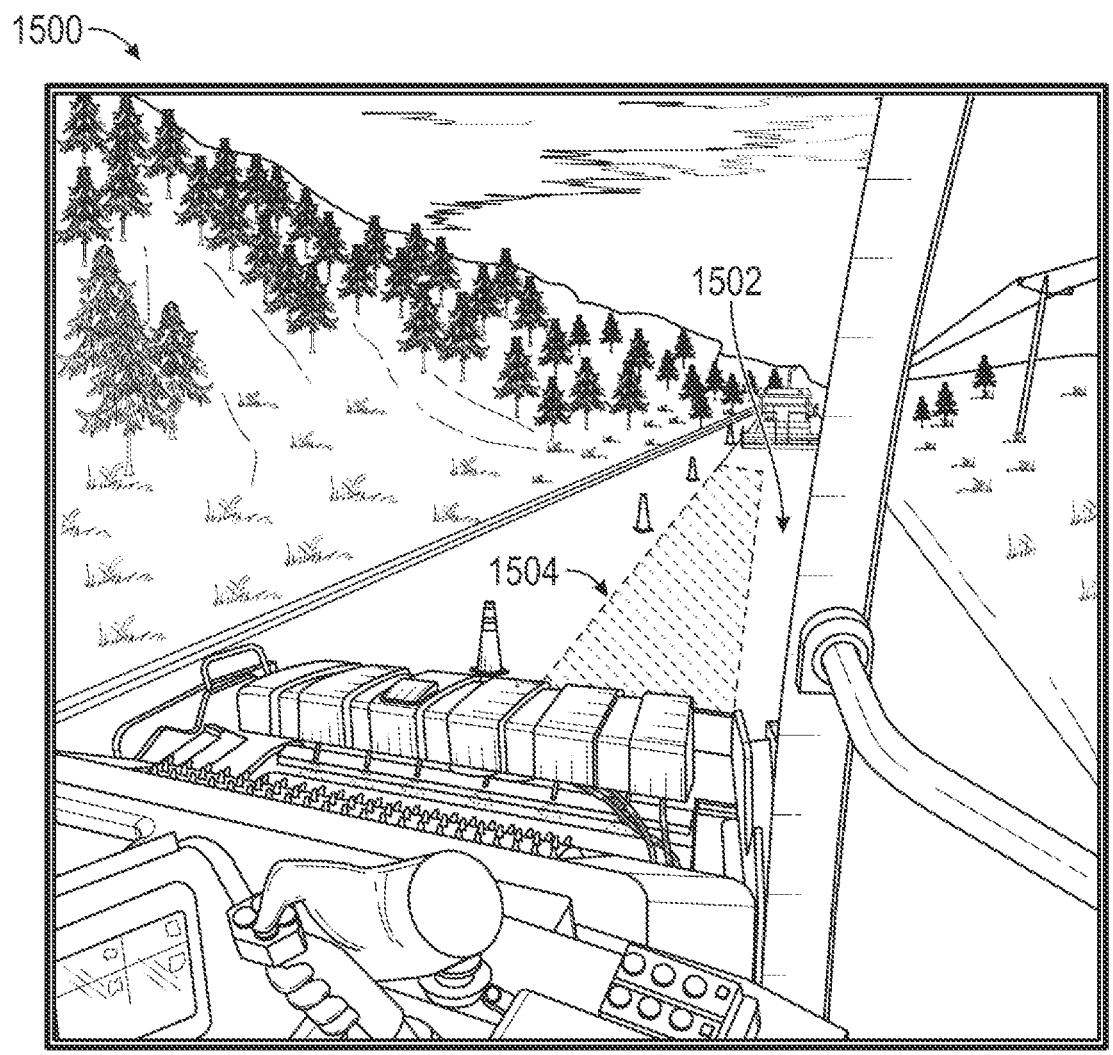
Figure 16:
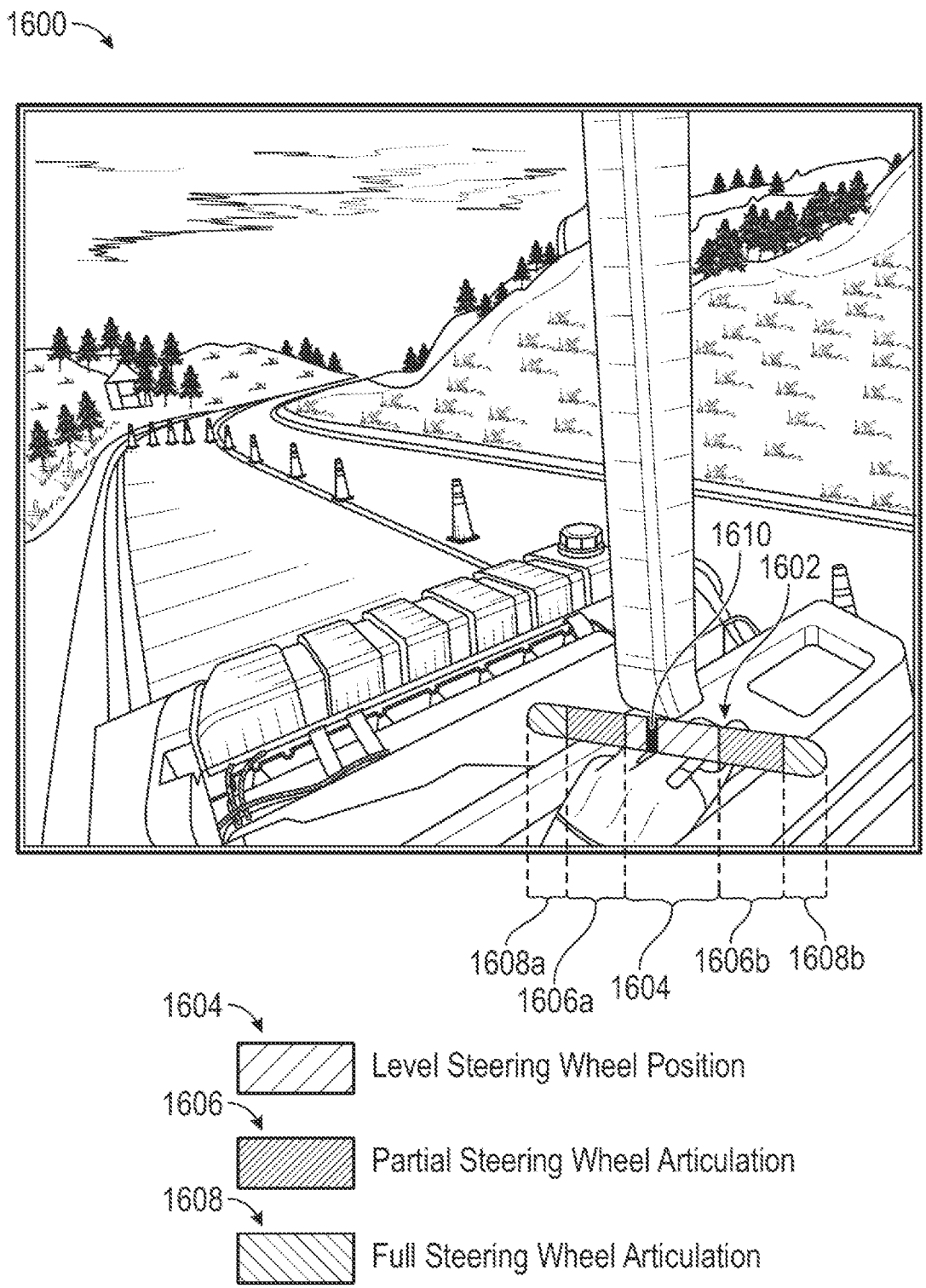

FIG. 14, FIG. 15, and FIG. 16 illustrate example GUIs related to operating the machine 410, for example, after setting the amplitude settings and confirming that the machine 410 is in operating condition. In the illustrated examples, the GUIs display a guided application process with callouts for settings and a highlighted guided pattern path. The head mountable display system 300 may display the callouts and the highlighted guided pattern path when the Helpers setting is enabled, and the head mountable display system 300 may forego displaying the callouts and/or the highlighted guided pattern path when the Helpers setting is disabled. The GUIs simulate the operator sitting in the operator station of the machine 410. That is, the GUIs provide a field of view from the perspective of the operator sitting in the operator station of the machine 410. For example, the GUIs may display the same controls that the operator has access to when sitting in the operator station 126 or the operator station 134 of FIG. 1.

FIG. 14 illustrates a GUI 1400 including controls 1402 that the operator may select to operate the machine 410. The GUI 1400 also includes a first callout 1404 and a second callout 1406 related to operation of the machine 410. For example, the first callout 1404 indicates a groundspeed of the machine 410 measured in impacts per foot (IPF) (e.g., "Machine Speed 12 ipf"). The second callout 1406 provides guidance on using the controls. For example, the second callout 1406 indicates that some buttons may be pressed and held for different types of input.

The GUI 1400 of FIG. 14 also includes a portion of a path 1410 including a highlighted guided pattern path 1412. The highlighted guided pattern path 1412 may help guide the operator across the path 1410 as the operator operates the machine 410. For example, the highlighted guided pattern path 1412 may indicate the portion of the path 1410 across which the operator is to move the machine 410.

FIG. 15 illustrates a GUI 1500 that includes a path 1502 and a highlighted guide path 1504 across which the operator is to move the machine 410. The GUI 1500 may also help train the operator to perform proper lever control, for example, to move the machine 410 in position relative to the highlighted guide path 1504.

FIG. 16 illustrates a GUI 1600 to train the operator with steering wheel control. For example, the GUI 1600 includes a guide 1602 to indicate a current steering wheel position. The guide 1602 provides a visual guide to the operator as the operator adjusts the steering wheel as the operator may be unable to receive tactile feedback of rotating or adjusting the steering wheel. The guide 1602 includes a first range 1604, a second range 1606, and a third range 1608 indicating different levels of steering wheel articulation based on the current positioning of the steering wheel. For example, the first range 1604 may indicate that the machine 410 is traveling with a level steering wheel position, the second range 1606 may indicate that the machine 410 is traveling with a partial steering wheel articulation, and the third range 1608 may indicate that the machine 410 is traveling with a full steering wheel articulation. The partial steering wheel articulation indicated by the second range 1606 may indicate that the current steering wheel position is between a level setting, as indicated by the first range 1604, and fully articulated, as indicated by the third range 1608.

As the operator moves the machine 410 across the path, an indicator 1610 of the guide 1602 may move to indicate the current level of steering wheel positioning (e.g., level, partially articulated, or fully articulated) as the machine 410 travels across the path (e.g., the path 1410 of FIG. 14 or the path 1502 of FIG. 15). The indicator 1610 may also indicate if the operator is veering to one side or the other side, which may help guide the operator to adjust the steering wheel. For example, the indicator 1610 may be located in a first portion 1606a of the second range 1606 or a first portion 1608a of the third range 1608 to indicate that the steering wheel is in a partially articulated position or a fully articulated position, respectively, in a first direction. The indicator 1610 may be located in a second portion 1606b of the second range 1606 or a second portion 1608b of the third range 1608 to indicate that the steering wheel is in a partially articulated position or a fully articulated position, respectively, in a second direction. Based on the portion of the range indicated by the indicator 1610, the operator may determine the direction and an amount of correction to apply to the steering wheel to move the machine 410 to a level position.

Figure 17:
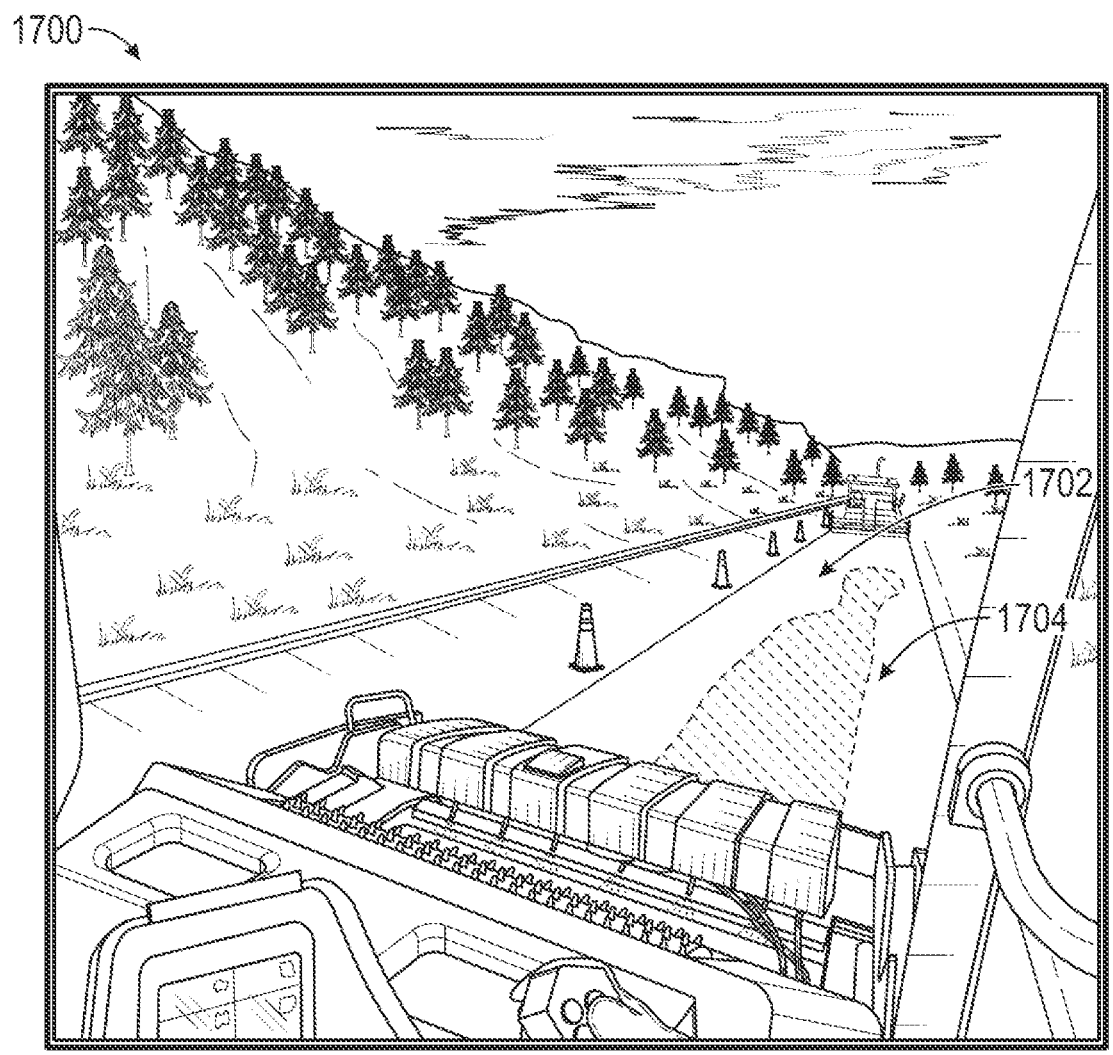

FIG. 17 illustrates a GUI 1700 including a path 1702 and a portion 1704 of the path 1702 travelled by the machine 410. In the example of FIG. 17, the Helpers setting (e.g., the second virtual object 704 of FIG. 7) is disabled and, thus, the operator training application and the headset controller 312 of the head mountable display system 300 forego displaying a guide to indicate the traveling path of the machine 410. For example, the GUI 1700 does not include the path 1502 of FIG. 15.

Figure 18:
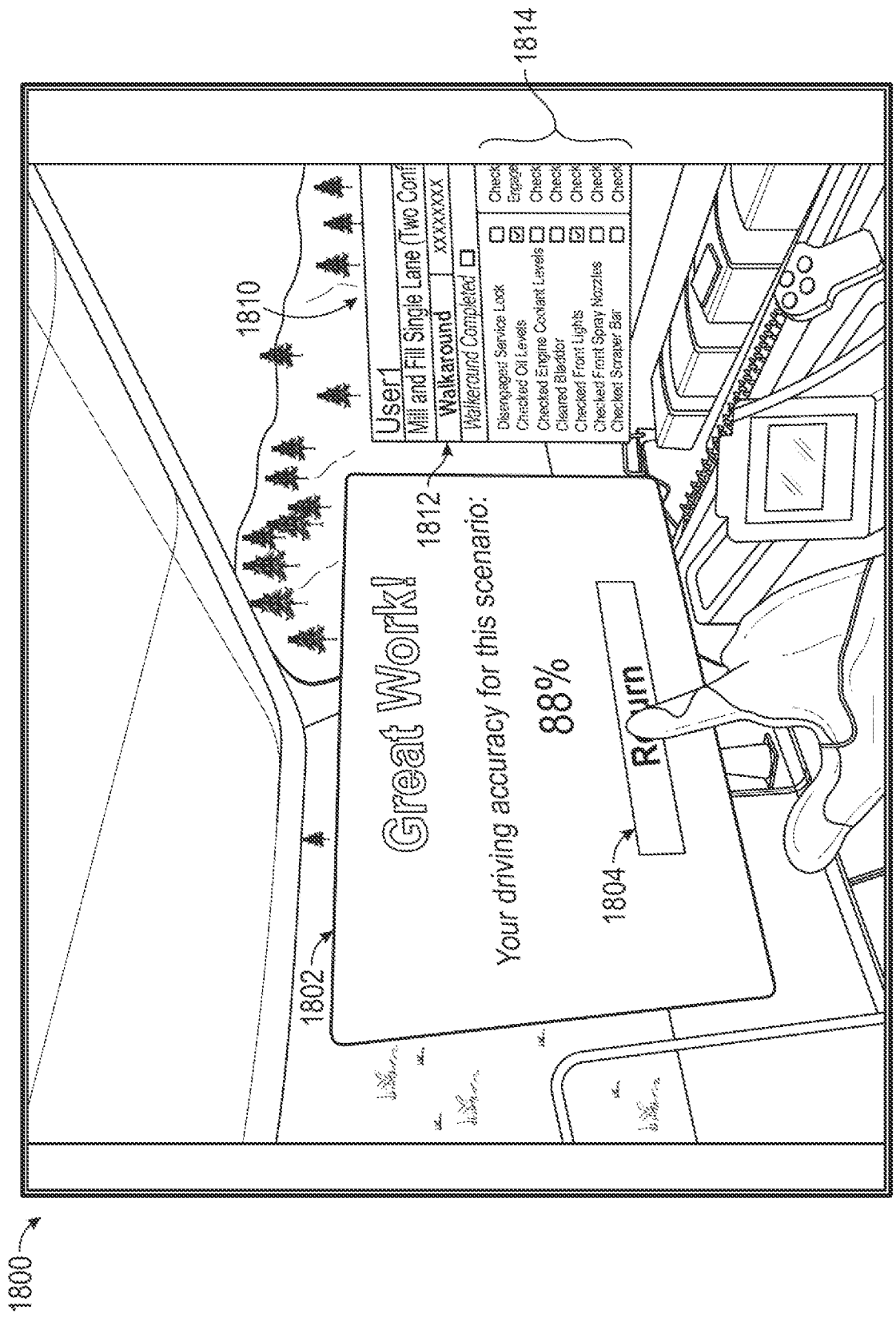
Figure 19:
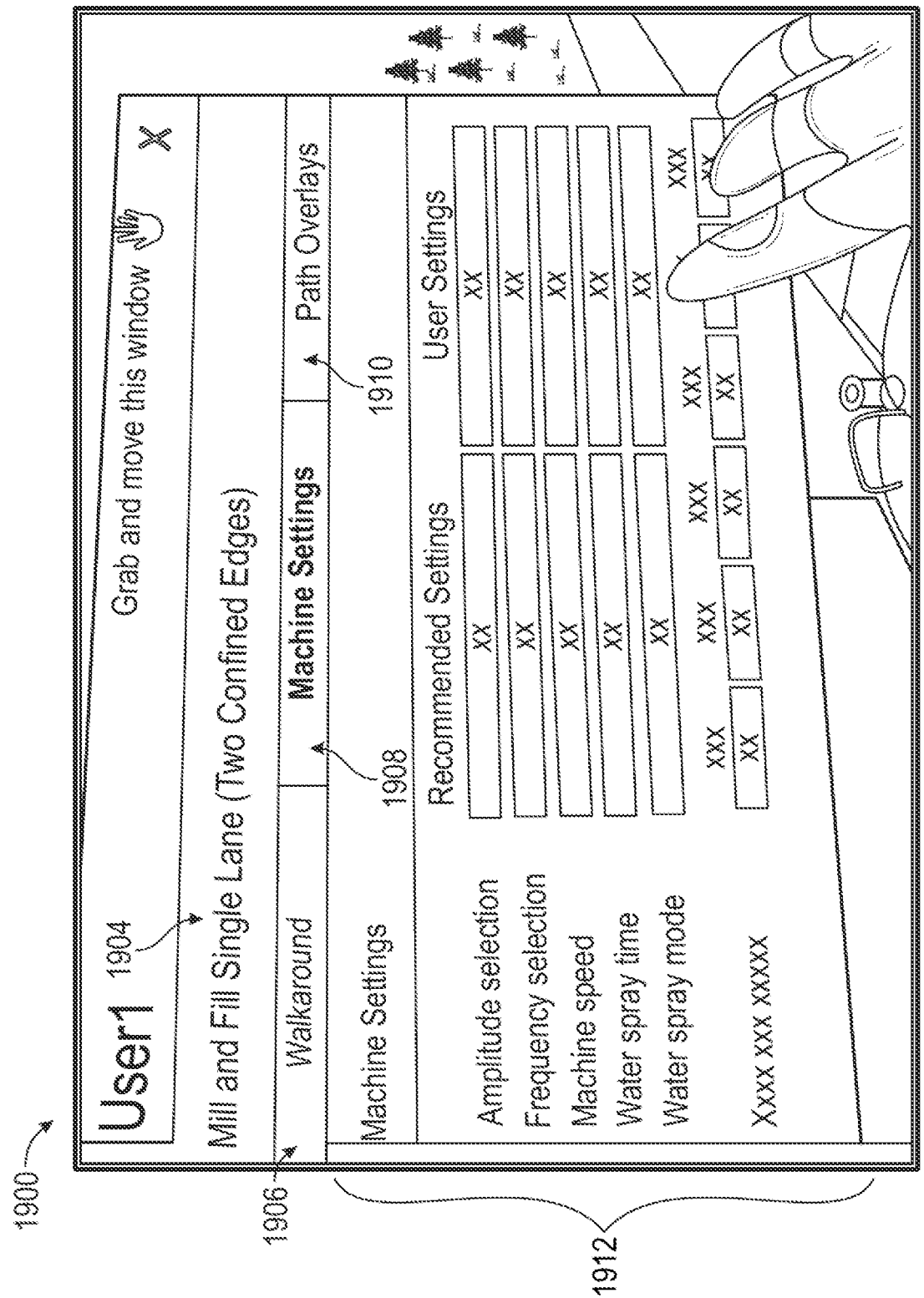
Figure 20:
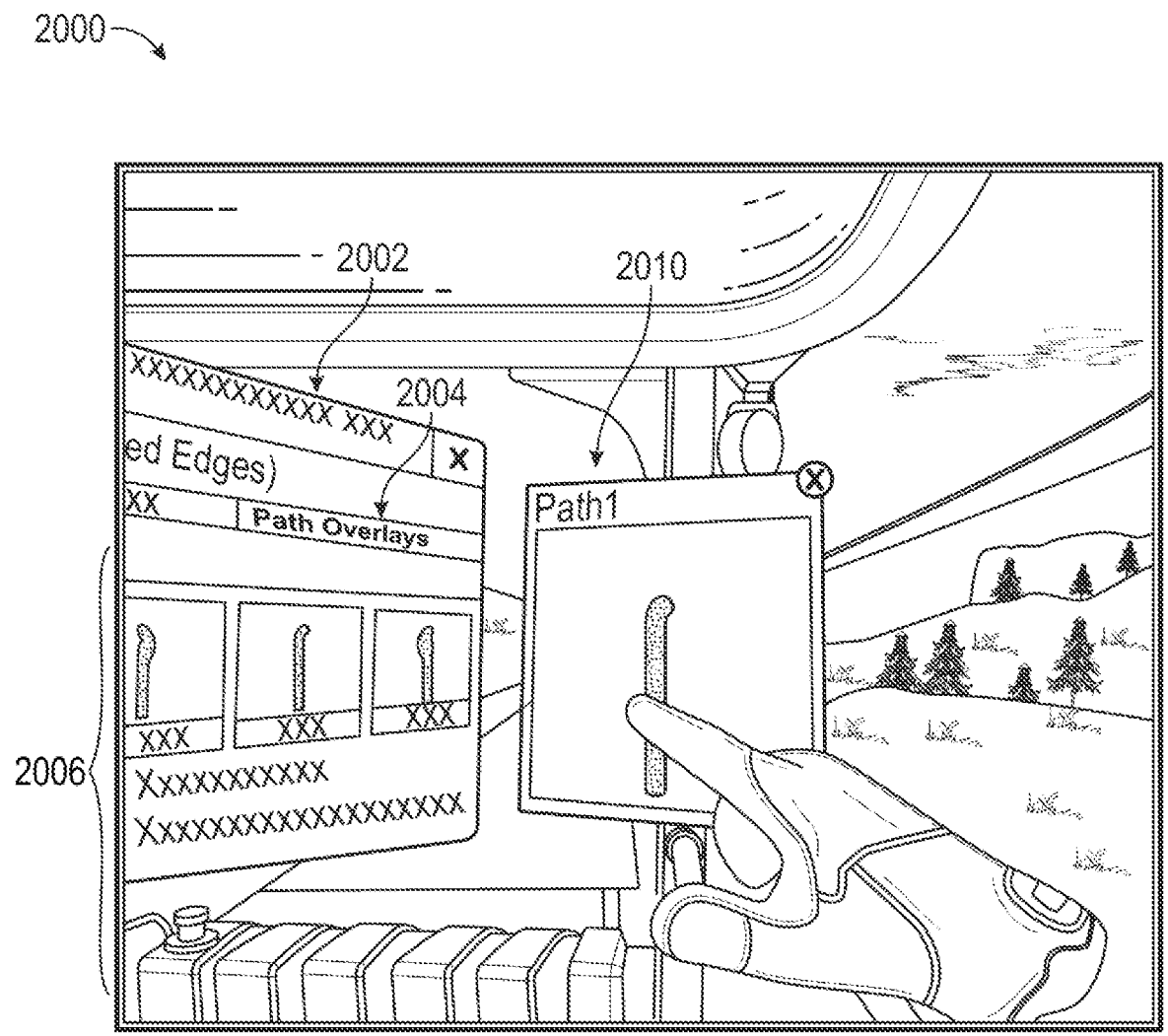
Figure 23:
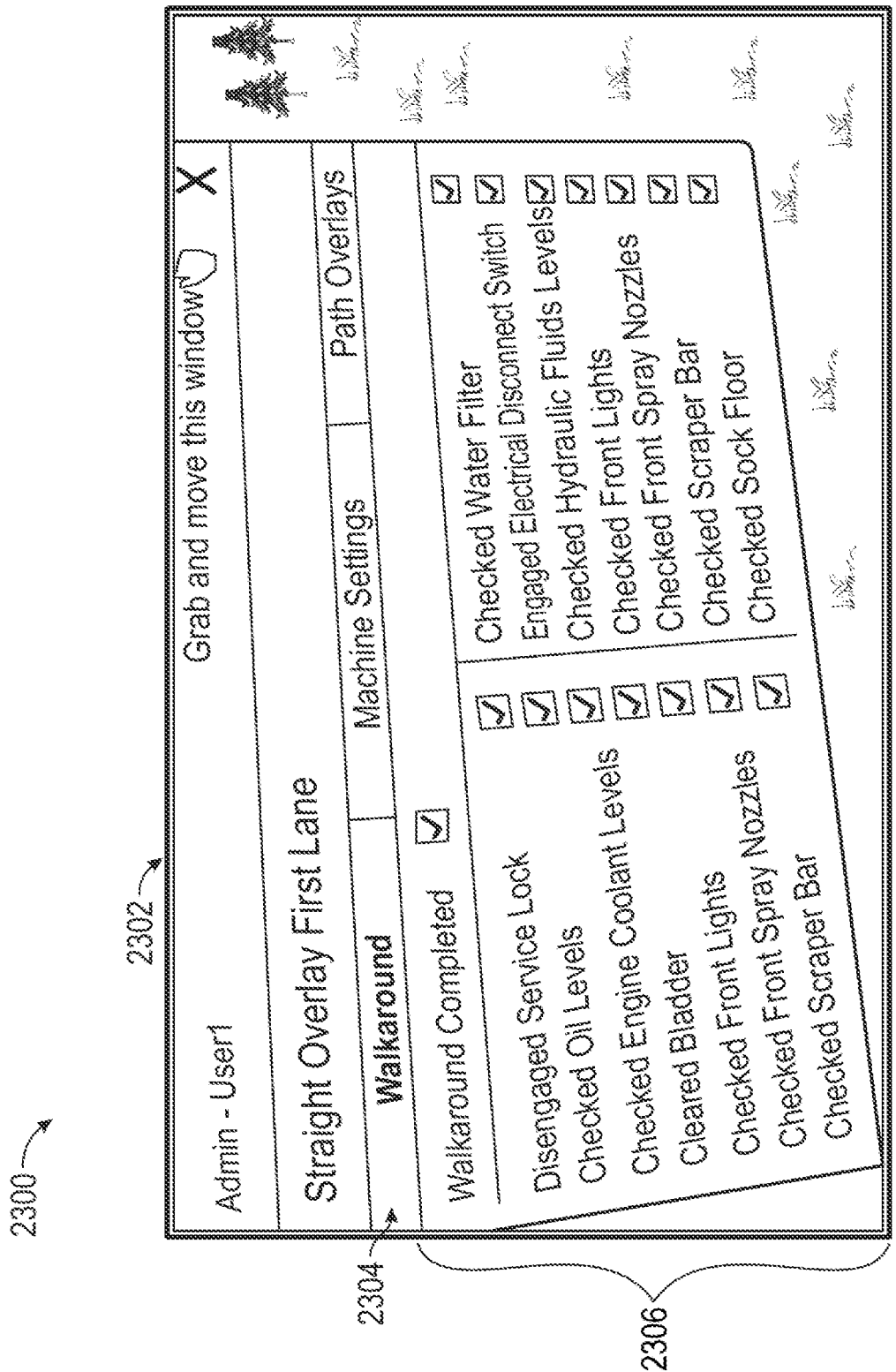
Figure 24:
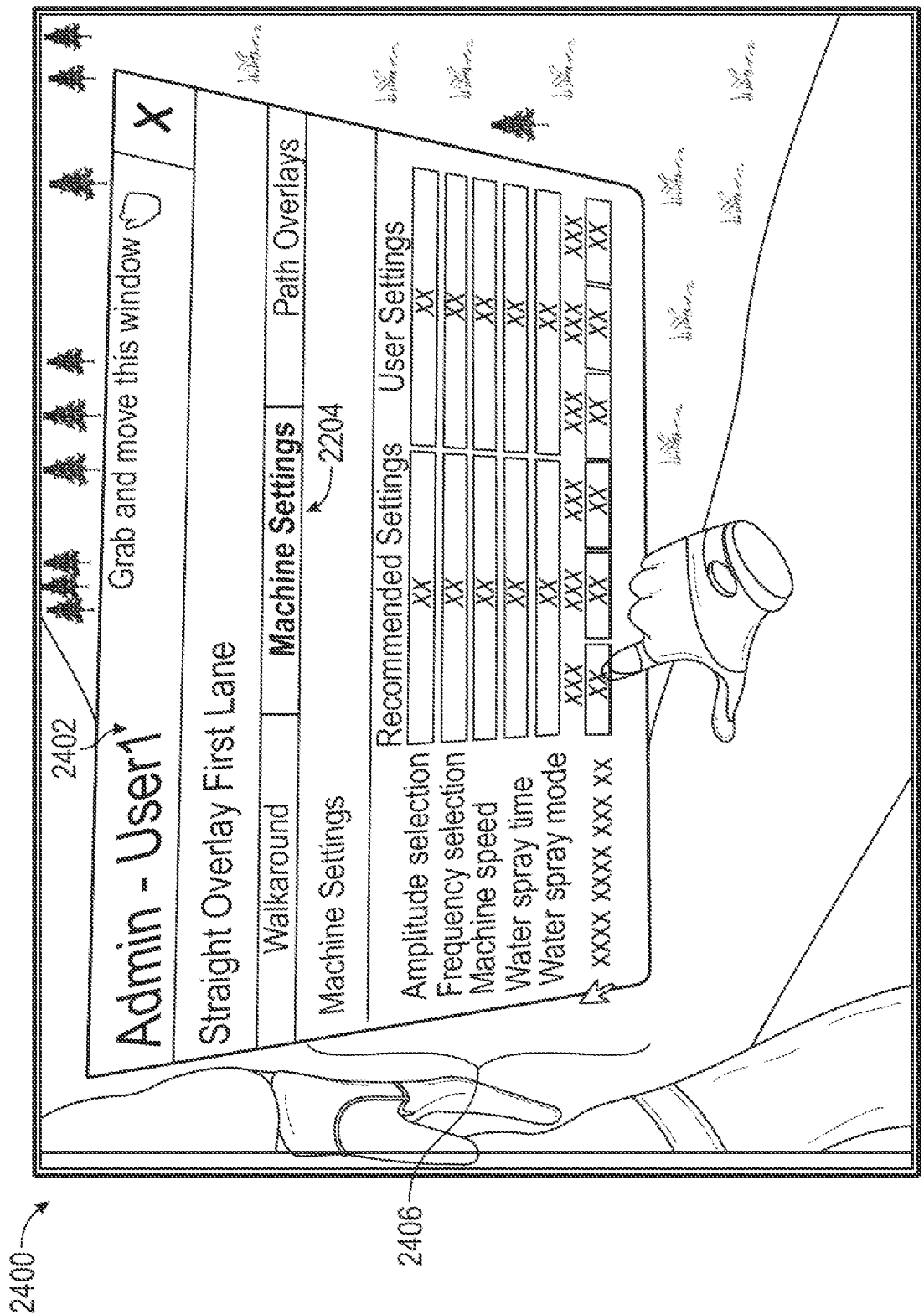
Figure 25:
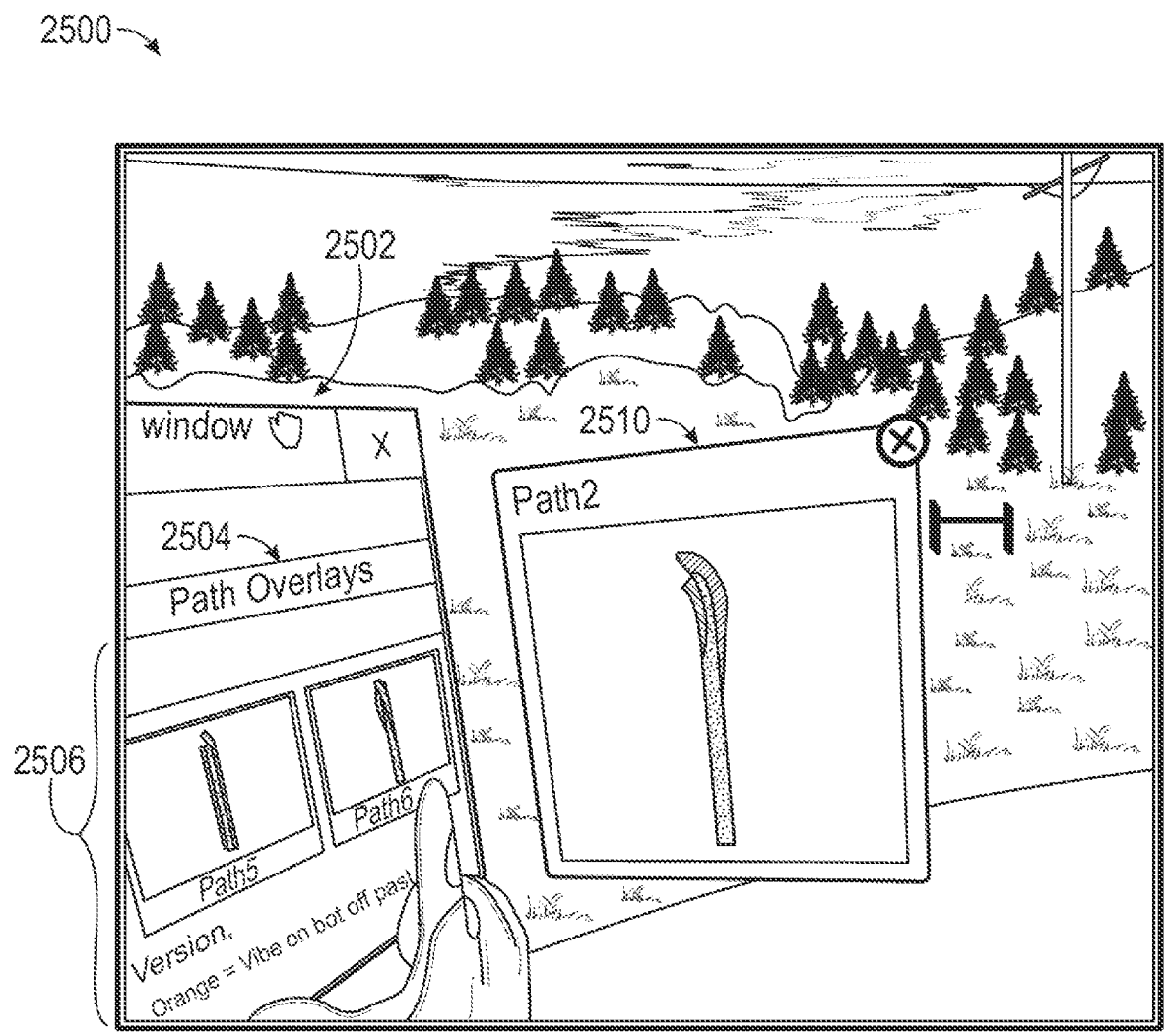

FIG. 18, FIG. 19, and FIG. 20 illustrate example GUIs related to providing feedback to the operator. FIG. 23, FIG. 24, and FIG. 25 illustrate example GUIs related to providing an assessment for an operator to an administer or a supervisor. The feedback may be provided after the operator completes the performing of tasks related to a scenario. The assessment may be provided to the administer when the administrator is logged into their profile, as described in connection with the profile selection menu 520 of FIG. 5C, and when the operator completes the tasks related to a scenario. The assessment may include a score assessment and/or feedback. For example, a score window may indicate a score assessment related to performing a current scenario. In some examples, the score assessment may be a numerical score (e.g., 100%, 88%, etc.). In some examples, the score assessment may represent a range of scores. For example, a first score assessment of "Excellent" may indicate a range of scores between 91% and 100%, a second score assessment of "Great" may indicate a range of scores between 81% and 90%, etc. However, other examples may include additional or alternate techniques for providing a score assessment. Aspects of a score window are described in connection with FIG. 18.

A feedback window may provide feedback related to different tasks associated with a scenario. The feedback window may include selectable virtual objects related to the different tasks associated with the current scenario. For example, the feedback window may include a first selectable virtual object ("Walkaround") that, when selected, indicates the different tasks associated with performing a walkaround of the machine 410 and which of the different tasks were completed by the operator. Aspects of the first selectable virtual object of the feedback window are described in connection with FIG. 18 and FIG. 23.

The feedback window may also include a second selectable virtual object ("Machine Settings") that, when selected, indicates the recommended settings and the operator selected settings for performing the respective scenario. Aspects of the second selectable virtual object of the feedback window are described in connection with FIG. 19 and FIG. 24.

The feedback window may also include a third selectable virtual object ("Path Overlays") that, when selected, indicates the path for performing a scenario and the path taken by the operator when performing the scenario. Aspects of the third selectable virtual object of the feedback window are described in connection with FIG. 20 and FIG. 25.

FIG. 18 illustrates a GUI 1800 including a score window 1802 that displays a score assessment related to performing a scenario. As shown in FIG. 18, the operator received a score assessment (e.g., "88%") related to a driving accuracy assessment of the operator performing the current scenario. The score window 1802 also includes a virtual object 1804 ("Return") that is a selectable virtual object. The operator may select the virtual object 1804 to navigate to a previous GUI, for example, to select a new scenario or to restart the current scenario. For example, selecting the virtual object 1804 may return the operator to the GUI 600 of FIG. 6 to select a new scenario or to restart the same scenario and to disable the Helpers setting (e.g., by deselecting the second virtual object 704 of FIG. 7).

The GUI 1800 also displays a portion of a feedback window 1810 that provides feedback for the operator performance related to the current scenario. As described above, the feedback window 1810 may include different selectable virtual objects corresponding to different tasks associated with a scenario. For example, the feedback window 1810 of FIG. 18 indicates that the current scenario is the third virtual object 614 of the scenario selection menu 602 of FIG. 6 (e.g., "Mill and Fill Single Lane (Two Confined Edges)"). In the example of FIG. 18, a first selectable virtual object 1812 ("Walkaround") is selected and an assessment portion 1814 of the feedback window 1810 displays one or more sub-tasks associated with the Walkaround task and which of the one or more sub-tasks the operator completed.

It may be appreciated that while the GUI 1800 displays a portion of the feedback window 1810, the operator may move their head to adjust their field of view to see the feedback window 1810 in its entirety. For example, FIG. 19 illustrates a GUI 1900 that includes a feedback window 1902. The feedback window 1902 of FIG. 19 may correspond to the feedback window 1810 of FIG. 18. For example, the feedback window 1902 includes a portion 1904 that displays the current scenario (e.g., "Mill and Fill Single Lane (Two Confined Edges)"). The feedback window 1902 also includes a first virtual object 1906 ("Walkaround"), a second virtual object 1908 ("Machine Settings"), and a third virtual object 1910 ("Path Overlays") that are each selectable virtual objects. The first virtual object 1906 may correspond to the first selectable virtual object 1812 of FIG. 18.

When one of the selectable virtual objects are selected, the operator training application and the headset controller 312 of the head mountable display system 300 update an assessment portion 1912 of the feedback window 1902 to display aspects related to the corresponding task. For example, in the example of FIG. 19, the second virtual object 1908 is selected (e.g., as indicated by the highlighted text) and the contents of the assessment portion 1912 are updated to display information related to performing the related task ("Machine Settings"). As shown in FIG. 19, the contents of the assessment portion 1912 indicate recommended settings for different operating parameters of the machine 410 and user-selected settings ("User Settings") for the different operating parameters. Thus, the operator is able to immediately receive feedback on how they performed the scenario and differences and similarities in the recommended settings and the user-selected settings. In the illustrated example of FIG. 19, the assessment portion 1912 may also display the quantity of passes that the operator performed on the path and respective throttle percentages per pass.

FIG. 20 illustrates a GUI 2000 that includes a feedback window 2002. Aspects of the feedback window 2002 may be similar to the feedback window 1810 of FIG. 18 and/or the feedback window 1902 of FIG. 19. In the example of FIG. 20, a virtual object 2004 ("Path Overlays") is selected, as indicated by the highlighted text. Based on the selected virtual object, the operator training application and the headset controller 312 of the head mountable display system 300 update an assessment portion 2006 of the feedback window 2002 to display aspects related to the corresponding task (e.g., the Path Overlays task). For example, in the example of FIG. 20, the contents of the assessment portion 2006 provide visual feedback of the different passes. Additionally, the operator may select a particular pass and receive additional feedback related to the pass or view a larger version of the feedback. For example, the operator may select the first pass ("Path1") and a window 2010 may be displayed providing a larger version of the first pass displayed in the assessment portion 2006. The visual feedback of a pass may include an indicator of when the operator was traveling on the path, when the operator was operating with amplitude settings enabled but off the path, when the operator was operating with amplitude settings disabled but off the path, etc.

As shown in FIGS. 18 to 20, the operator training application may provide immediate learning assessments to the operator to provide feedback on outcome of learning and/or areas of improvement after completing a scenario.

Figure 21:
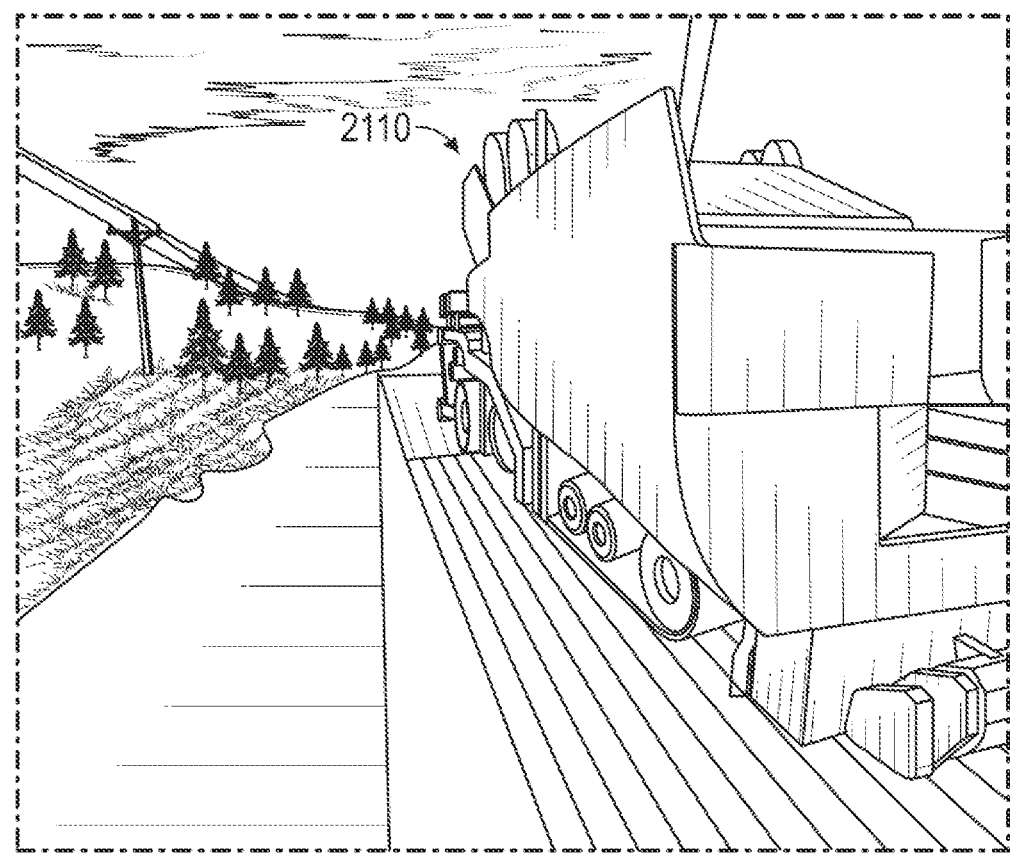

FIG. 21 illustrates a GUI 2100 that illustrates a field of view of the operator including a portion of a machine 2110. Aspects of the machine 2110 may be the same as the machine 410 of FIG. 4.

Figure 22:
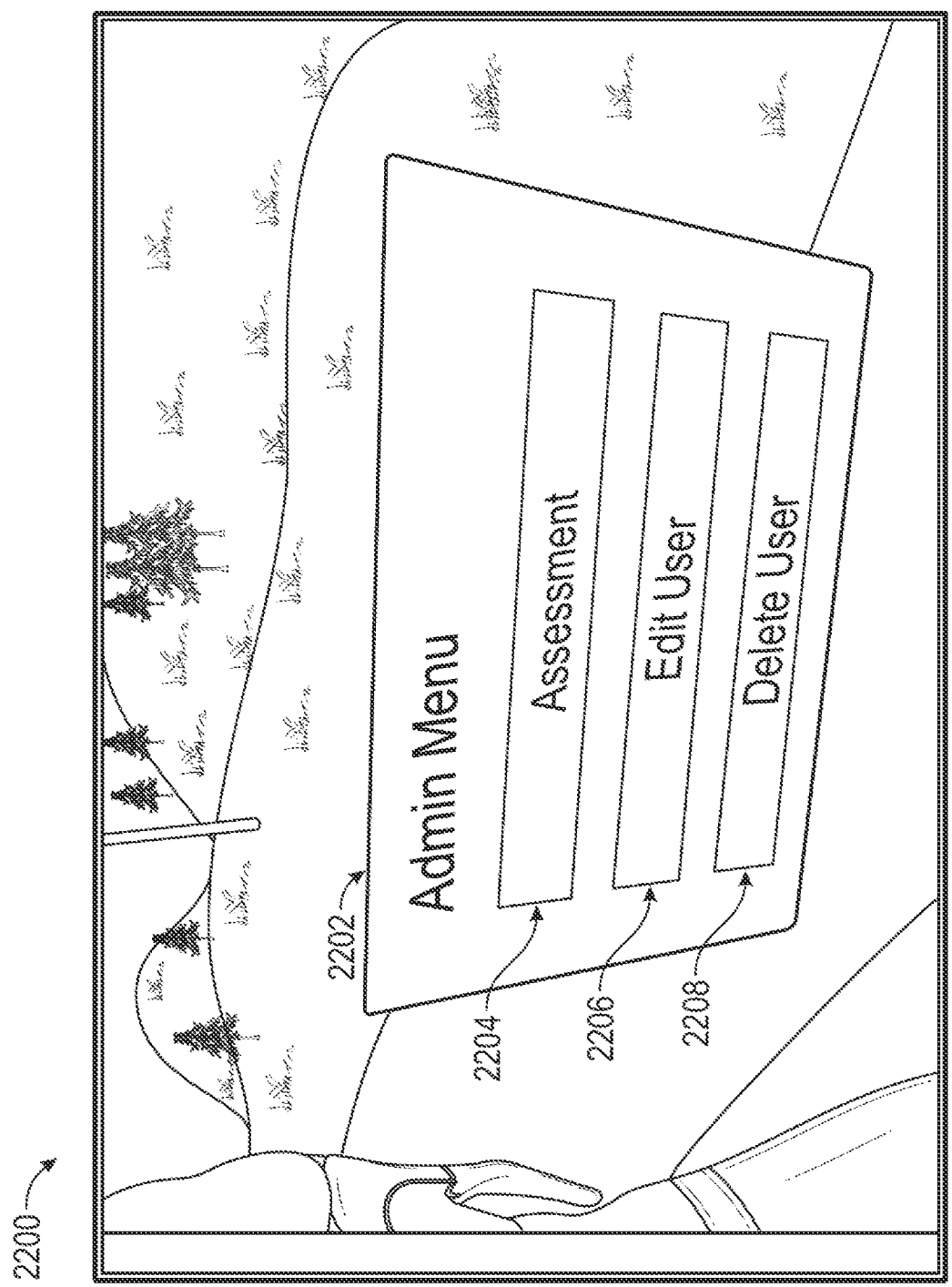

FIG. 22, FIG. 23, FIG. 24, and FIG. 25 illustrate different GUIs related to administrator views of assessments. For example, FIG. 22 illustrates a GUI 2200 including a menu 2202 that provides different options and views that the administrator may access. The administrator may be presented the menu 2202 of FIG. 22 after completing the procedure associated with the "admin" profile of FIG. 5C. As shown in FIG. 22, the menu 2202 includes a first virtual object 2204 ("Assessment"), a second virtual object 2206 ("Edit User"), and a third virtual object 2208 ("Delete User"). The administrator may select the first virtual object 2204 to access assessment information for an operator. The administrator may select the second virtual object 2206 to modify information about a user (e.g., an operator) or to switch the current user. The administrator may select the third virtual object 2208 to delete a user account (e.g., a profile associated with an operator).

Similar to the example GUIs of FIGS. 18 to 20, the example GUIs of FIGS. 23 to 25 illustrate GUIs related to assessments of an operator performing a scenario. For example, FIG. 23 illustrates a GUI 2300 including a feedback window 2302. In the example of FIG. 23, the feedback window 2302 indicates that the current user is an administer and that the administrator is reviewing the assessment related to a user ("Admin—User1"). Aspects of the feedback window 2302 may be similar to the feedback window 1810 of FIG. 18 in which feedback related to a walkaround task is displayed via the feedback window 2302. As shown in FIG. 23, the feedback window 2302 indicates the current scenario (e.g., a "Straight Overlay First Lane" scenario) and a selectable virtual object 2304 ("Walkaround") is selected to display feedback related to the walkaround task in an assessment portion 2306 of the feedback window 2302. For example, the operator training application and the headset controller 312 of the head mountable display system 300 may update the assessment portion 2306 to display the one or more sub-tasks associated with performing the walkaround task. The assessment portion 2306 may also indicate which of the one or more sub-tasks were completed or not completed by the operator when the operator was performing the walkaround task of the current scenario. In the example of FIG. 23, the assessment portion 2306 indicates that the operator completed each of the sub-tasks related to the walkaround task.

FIG. 24 illustrates a GUI 2400 that displays feedback related to the machine settings task of the current scenario. For example, the GUI 2400 includes a feedback window 2402 in which a virtual object 2404 ("Machine Settings") is selected and an assessment portion 2406 of the feedback window 2402 displays information related to the machine settings task of the current scenario (e.g., the "Straight Overlay First Lane" scenario). Aspects of the feedback window 2402 may be similar to the feedback window 1902 of FIG. 19. For example, the operator training application and the headset controller 312 of the head mountable display system 300 may update the information displayed in the assessment portion 2406 to display the recommended settings for performing the current scenario and the user-selected settings that the operator selected to perform the current scenario. The assessment portion 2406 also displays information related to each pass that the operator performed. For example, the assessment portion 2406 of FIG. 24 may display the throttle percentage per pass.

FIG. 25 illustrates a GUI 2500 that displays feedback related to the path overlays task of the current scenario. For example, the GUI 2500 includes a feedback window 2502 in which a virtual object 2504 ("Path Overlays") is selected and an assessment portion 2506 of the feedback window 2502 displays information related to the path overlays task of the current scenario. Aspects of the feedback window 2502 may be similar to the feedback window 2002 of FIG. 20. For example, the operator training application and the headset controller 312 of the head mountable display system 300 may update the information displayed in the assessment portion 2506 to display visual feedback including the desired path and the operator path associated with each pass. Additionally, the administrator may select a particular pass and view additional feedback related to the pass or view a larger version of the feedback. For example, the administrator may select the second pass ("Path2") and a window 2510 may be displayed providing a larger version of the second pass displayed in the assessment portion 2506. Similar to the example of FIG. 20, the visual feedback of a pass may include an indicator of when the operator was traveling on the path, when the operator was operating with amplitude settings enabled but off the path, when the operator was operating with amplitude settings disabled but off the path, etc.

As shown in FIGS. 23 to 25, the operator training application may provide immediate learning assessments to the administer to enable the administer to determine whether the operator is capable of operating the machine.

Figure 26:
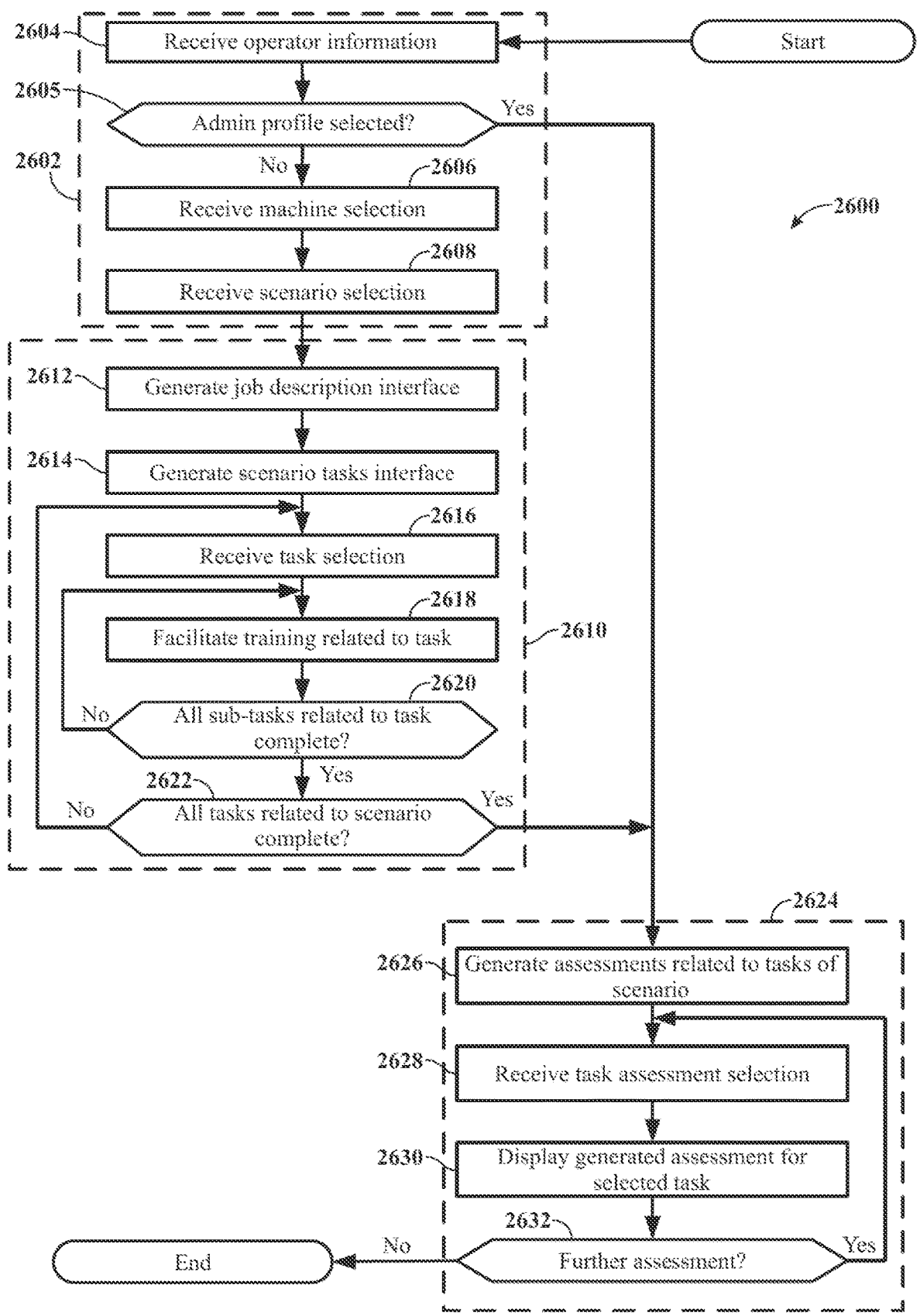
FIG. 26 is a flowchart of a process to facilitate an operator training application, in accordance with various aspects of the present disclosure.

FIG. 26 is a flowchart of a process 2600 to facilitate an operator training application, in accordance with various aspects of the present disclosure. The process 2600 may be implemented by the headset controller 312 of the head mountable display system 300. Any of the user operations and/or interactions described herein, such as the input of data by a user (e.g., an operator or an administrator) during any portion of the process 2600, may be performed via a graphical user interface that is generated by the headset controller 312 and/or the hand controls 320 of the head mountable display system 300. For example, the headset controller 312 may generate a graphical user interface and display the generated graphical user interface via the display screen 304 of the head mountable display device 302. The headset controller 312 may receive data from the sensor system 330 of the head mountable display device 302 and the hand controls 320 to adjust the field of view of the operator, and/or to receive input selections. For example, the headset controller 312 may obtain data from the one or more headset sensors 332 of the head mountable display device 302 and determine to update a field of view of the user and/or generate a new graphical user interface. In other examples, the user may use the one or more navigation controls 322 of the hand controls 320 to select a selectable virtual object of a graphical user interface displayed via the display screen 304. The headset controller 312 may receive data from the hand controls 320 related to the use of the one or more navigation controls 322 and/or the one or more hand control sensors 334 and update the graphical user interface or display a new graphical user interface accordingly.

In the example of FIG. 26, when the headset controller 312 generates an interface, it may be appreciated that the headset controller 312 also displays the generated interface via the display screen 304. Additionally, in the example of FIG. 26, when the headset controller 312 receives a selection, it may be appreciated that the headset controller 312 receives data relating to a virtual object of a displayed graphical user interface being selected by the user.

In an embodiment, the process 2600 may include a setup stage 2602, an execution stage 2610, and an assessment stage 2624 related to operating the operator training application. For example, after subprocesses corresponding to the setup stage 2602 are complete, the process 2600 may perform one or more subprocesses of the execution stage 2610, and then perform one or more subprocesses of the assessment stage 2624 after the subprocesses corresponding to the execution stage 2610 are completed.

In the illustrated example of FIG. 26, the setup stage 2602 includes subprocesses related to performing operator training application setup. For example, performing the subprocesses of the setup stage 2602 may include the headset controller 312 generating one or more GUIs related to setup of the operator training application, one or more GUIs related to familiarizing the operator with using the operator training application, and accessing a profile associated with the operator, as described in connection with the example GUIs of FIGS. 4, 5A, 5B, 5C, 6, and 20. For example, at subprocess 2604, the headset controller 312 may receive operator information, such as enabling the operator login to their profile, as described in connection with the example GUIs of FIGS. 5A, 5B, and 5C. At subprocess 2605, the headset controller 312 may determine whether the user selected an operator profile or an administrator ("admin") profile. If, at subprocess 2605, the headset controller 312 determines that the user selected an administrator profile, then control proceeds to subprocess 2626 to generate assessments related to tasks of a scenario. If, at subprocess 2605, the headset controller 312 determines that the user selected an operator profile, control proceeds to subprocess 2606. At subprocess 2606, the headset controller 312 may receive a machine selection. For example, the operator training application may be configured to provide guided operator training for one or more machines and the operator may select which of the one or more machines on which to be trained. At subprocess 2608, the headset controller 312 may receive a scenario selection that the operator wants to perform. In some examples, the scenarios may facilitate familiarizing the operator with use of the machine. In some examples, the scenarios may facilitate familiarizing the operator with a particular job, for example, based on a job to be performed at a work site. Example scenarios include an asphalt compactor rolling pattern scenario, a paving-by-numbers scenario, a milling-by-numbers scenario, a straight overlay first lane scenario, a mill and fill single lane (two confined edges) scenario, etc. Aspects of selecting a scenario are described in connection with the example GUI 600 of FIG. 6.

After the subprocesses of the setup stage 2602 are complete, the process 2600 facilitates performing subprocesses related to the execution stage 2610. The execution stage 2610 includes subprocesses related to training for the selected scenario (e.g., at the subprocess 2608). For example, performing the subprocesses of the execution stage 2610 may include the headset controller 312 generating one or more GUIs related to identifying one or more tasks related to the scenario, and performing the one or more tasks related to the scenario, as described in connection with the example GUIs of FIGS. 7 to 17. For example, at subprocess 2612, the headset controller 312 may generate a job description interface that displays a description related to a job for the user to perform, as described in connection with the GUI 700 of FIG. 7. The user may also select whether to enable or disable the Helpers setting, as described in connection with the second virtual object 704 of FIG. 7. As described above, when the Helpers setting is enabled, the operator is guided through the scenario via helpers, such as the highlighted guide path 1504 of FIG. 15. The operator also receives feedback at the completion of the scenario on how they performed. When the Helpers setting is disabled, the operator does not receive guidance when performing tasks of a scenario. The operator may also receive an assessment score and feedback at the completion of the scenario. Additionally, when the Helpers setting is disabled, the assessment is saved and may be accessed by an administrator or supervisor.

At subprocess 2614, the headset controller 312 may generate a scenario tasks interface that displays one or more tasks associated with completing a scenario. For example, the headset controller 312 may generate the GUI 800 of FIG. 8 to display aspects related to the current scenario, such as a Vibe Selection Chart, as described in connection with FIGS. 9 and 10. In another example, the headset controller 312 may generate the GUIs of FIGS. 11 to 13 to display the one or more sub-tasks associated with performing the Walkaround task (e.g., the checklist 1102 of FIG. 11). The headset controller 312 may update a GUI presented to the user as the user moves around the machine to perform the one or more sub-tasks associated with the task (e.g., checking the water filter, checking the oil levels, etc.).

At subprocess 2616, the headset controller 312 receives a task selection. For example, headset controller 312 may receive data from the hand controls 320 indicating that the user selected one of the selectable virtual objects of the scenario tasks interface. At subprocess 2618, the headset controller 312 facilitates training related to the selected task. For example, the headset controller 312 may generate and display an interface displaying different operating parameters and corresponding settings of the machine that may be selected by the user to perform the scenario, as described in connection with the GUI 1400 of FIG. 14.

At subprocess 2620, the headset controller 312 determines if all sub-tasks related to a task are complete. For example, and referring to the example of FIG. 11, the headset controller 312 may confirm if all sub-tasks included in the checklist 1102 are complete or if there are any sub-tasks still indicated as incomplete. If, at subprocess 2620, the headset controller 312 determines that there is at least one sub-task still incomplete, control returns to subprocess 2618 to continue facilitating training related to the task. For example, and referring to the example of FIG. 11, after completing the first task 1104 or the second task 1106, the headset controller 312 may determine that at least the third task 1108 is still indicated as an incomplete sub-task and, thus, facilitate training related to at least the third task 1108. In some examples, the headset controller 312 may forego determining if all sub-tasks related to a task are complete when the Helpers setting is disabled, as described in connection with the second virtual object 704 of FIG. 7. For example, when the Helpers setting is disabled, the operator training application may enable the operator to progress through the tasks as they want, even if one or more tasks are incomplete. In some examples, even when the Helpers setting is disabled, the operator may access the first pop-up menu 802 of FIG. 8 to view the Vibe Selection Chart (e.g., the pop-up menu 902 of FIG. 9) or the Walkaround Checklist (e.g., the checklist 1102 of FIG. 11).

If, at subprocess 2620, the headset controller 312 determines that all sub-tasks related to the task are complete, then control proceeds to subprocess 2622 and the headset controller 312 determines if all tasks related to a scenario are complete or if there are any tasks remaining. For example, tasks related to a scenario may include learning about and selecting settings related to operating parameters of a machine (e.g., as described in connection with FIGS. 9 and 10), performing a walkaround to confirm that the machine is in operating condition (e.g., as described in connection with FIGS. 11, 12, and 13), and performing one or more passes over a path, for example, to learn about steering wheel control and level controls (e.g., as described in connection with FIGS. 14 to 17). If, at subprocess 2622, the headset controller 312 determines that there is at least one task incomplete, then control returns to subprocess 2616 to receive a task selection.

If, at subprocess 2622, the headset controller 312 determines that all tasks related to the scenario are complete, then control proceeds to the assessment stage 2624 of the process 2600. The assessment stage 2624 includes subprocesses related to providing learning assessment to the user including feedback and/or areas of improvement. For example, and with respect to an operator, performing the subprocesses of the assessment stage 2624 may include the headset controller 312 generating one or more windows providing a score assessment and/or feedback related to completing a training scenario, as described in connection with the example GUIs of FIGS. 18 to 20. With respect to an administrator, performing the subprocesses of the assessment stage 2624 may include the headset controller 312 generating one or more windows providing feedback of an operator completing a training scenario, as described in connection with the example GUIs of FIGS. 23 to 25.

For example, at subprocess 2626, the headset controller 312 may generate assessments related to tasks of a scenario. For example, the headset controller 312 may generate assessments related to different tasks based on user selections and data received while the operator is performing the training scenario. In some examples, the assessment may include a score assessment, as described in connection with the example score window 1802 of FIG. 18. In some examples, the headset controller 312 may generate the score assessment when the Helpers setting of FIG. 7 is disabled while the operator is performing the training scenario.

In some examples, the assessment may include feedback, such as visual feedback based on operator performance while performing the training scenario. For example, the headset controller 312 may generate a walkaround assessment based on how many sub-tasks and/or which sub-tasks of the walkaround checklist the operator performed during the training scenario, as described in connection with the GUI 1800 of FIG. 18 and/or the GUI 2300 of FIG. 23. Based on the walkaround assessment, the user may determine which, if any, sub-tasks the operator did not perform.

In another example, the headset controller 312 may generate a machine settings assessment based on the user settings that the operator selected when selecting the operating parameters, as described in connection with the GUI 1900 of FIG. 19 and/or the GUI 2400 of FIG. 24. Based on the machine settings assessment, the user may determine how the user-selected settings compare to recommended settings for the training scenario.

In another example, the headset controller 312 may generate a path overlays assessment based on the path taken by the operator over one or more passes, as described in connection with the GUI 2000 of FIG. 20 and/or the GUI 2500 of FIG. 25. Based on the path overlays assessment, the user may determine how the operator performed with respect to steering wheel control and level control while operating the machine.

At subprocess 2628, the headset controller 312 may receive a task assessment selection, For example, the headset controller 312 may receive a selection of a virtual object corresponding to the walkaround task, the machine settings task, or the path overlays task, as described in connection with the example GUIs of FIGS. 18 to 20 and FIGS. 23 to 25.

At subprocess 2630, the headset controller 312 displays a generated assessment for the selected task, as described in connection with the assessment portions of the feedback windows of FIGS. 18 to 20 and FIGS. 32 to 25. For example, when the selected task assessment (e.g., at subprocess 2628) includes the walkaround task, the assessment portion of the feedback windows of FIGS. 18 and 23 may display one or more sub-tasks related to the walkaround task and indicate which of the sub-tasks were completed and/or which of the sub-tasks were non completed during the training scenario. When the selected task assessment (e.g., at subprocess 2628) includes the machine settings task, the assessment portion of the feedback windows of FIGS. 19 and 24 may display the recommended settings and the user-selected settings. When the selected task assessment (e.g., at subprocess 2628) includes the path overlay task, the assessment portion of the feedback windows of FIGS. 20 and 25 may display the paths taken by the operator versus the target path over one or more passes.

At subprocess 2632, the headset controller 312 determines if there are any further assessments to present or for a user to review. If, at subprocess 2632, the headset controller 312 determines that there is another assessment to present or for the user to review, then control returns to subprocess 2628 to receive a task assessment selection. In some examples, the headset controller 312 may determine that there is another assessment (e.g., at subprocess 2632) based on a user selection. For example, if the headset controller 312 receives a selection indicating that the user selected a virtual object related to another task, then the headset controller 312 may determine that there is another assessment to present. Otherwise, if the headset controller 312 receives a selection of a virtual object indicating that the user is exiting the assessment, then the example process 2600 of FIG. 26 may end.

Figure 27:
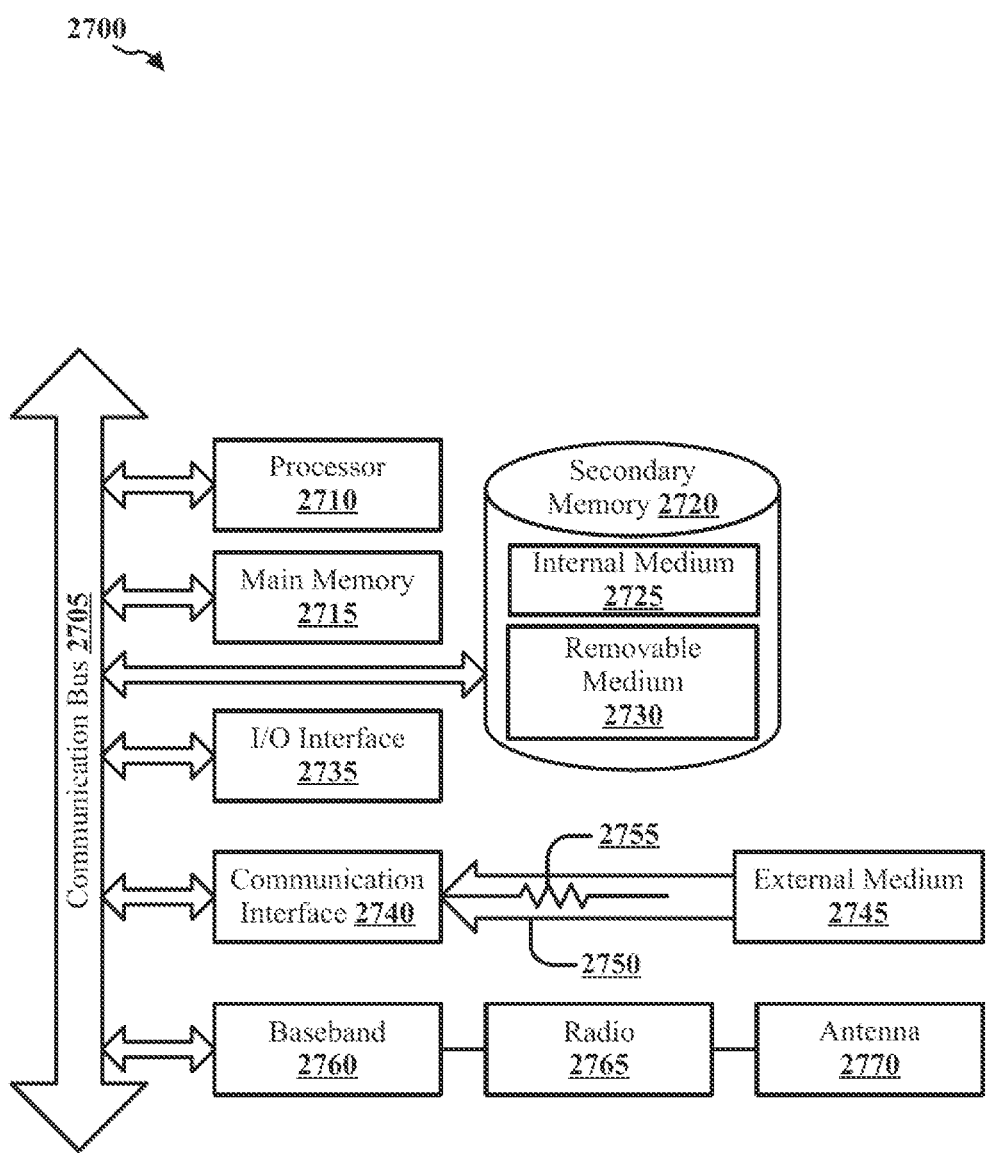
FIG. 27 illustrates an example processing system by which one or more of the processes described herein may be executed, in accordance with various aspects of the present disclosure.

FIG. 27 is a block diagram illustrating an example system 2700 that may be used in connection with various embodiments described herein. The system 2700 may be a wired system or a wireless system that may be used as or in conjunction with one or more of the functions, processes, or methods (e.g., to store and/or execute the software) described herein, and may represent components of the platform 210, the user system 220, the head mountable display system 300, and/or other processing devices described herein. For example, the system 2700 may implement the platform 210, may implement the network 230, and/or may implement the head mountable display system 300. The system 2700 can be a server or any conventional personal computer, or any other processor-enabled device that is capable of wired or wireless data communication. Other computer systems and/or architectures may be also used, as will be clear to those skilled in the art.

The system 2700 preferably includes a processor 2710. The processor 2710 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with the processor 2710. Examples of processors that may be used with the system 2700 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

The processor 2710 is preferably connected to a communication bus 2705. The communication bus 2705 may include a data channel for facilitating information transfer between storage and other peripheral components of the system 2700. Furthermore, the communication bus 2705 may provide a set of signals used for communication with the processor 2710, including a data bus, address bus, and/or control bus (not shown). The communication bus 2705 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 2788 general-purpose interface bus (GPIB), IEEE 696/S-100, and/or the like.

The system 2700 preferably includes a main memory 2715 and may also include a secondary memory 2720. The main memory 2715 provides storage of instructions and data for programs executing on the processor 2710, such as any of the software discussed herein. It should be understood that programs stored in the memory and executed by the processor 2710 may be written and/or compiled according to any suitable language, including without limitation C/C++, Java, JavaScript, Perl, Visual Basic, .NET, and the like. The main memory 2715 is typically a semiconductor-based memory, such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 2720 is a non-transitory computer-readable medium having computer-executable code (e.g., any of the software disclosed herein) and/or other data stored thereon. The computer software or data stored on the secondary memory 2720 is read into the main memory 2715 for execution by the processor 2710. The secondary memory 2720 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

The secondary memory 2720 may optionally include an internal medium 2725 and/or a removable medium 2730. The removable medium 2730 may be read from and/or written to in any well-known manner. The removable medium 2730 may be, for example, a magnetic tape drive, a compact disc (CD) drive, a digital versatile disc (DVD) drive, other optical drive, a flash memory drive, and/or the like.

In an embodiment, an input/output (I/O) interface 2735 provides an interface between one or more components of the system 2700 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

The system 2700 may include a communication interface 2740. The communication interface 2740 allows software and data to be transferred between the system 2700 and external devices (e.g. printers), networks, or other information sources. For example, computer software or executable code may be transferred to the system 2700 from a network server (e.g., the platform 210) via the communication interface 2740. Examples of the communication interface 2740 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing the system 2700 with a network (e.g., the network 230 of FIG. 2) or another computing device. The communication interface 2740 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via the communication interface 2740 are generally in the form of electrical communication signals 2755. The electrical communication signals 2755 may be provided to the communication interface 2740 via a communication channel 2750. In an embodiment, the communication channel 2750 may be a wired or wireless network (e.g., the network 230), or any variety of other communication links. The communication channel 2750 carries the electrical communication signals 2755 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in the main memory 2715 and/or the secondary memory 2720. Computer-executable code can also be received via the communication interface 2740 and stored in the main memory 2715 and/or the secondary memory 2720. Such computer programs, when executed, enable the system 2700 to perform various functions of the disclosed embodiments as described elsewhere herein.

In this description, the term "computer-readable medium" is used to refer to any non-transitory computer-readable storage media used to provide computer-executable code and/or other data to or within the system 2700. Examples of such media include the main memory 2715, the secondary memory 2720 (including the internal medium 2725 and/or the removable medium 2730), the external storage medium 2745, and any peripheral device communicatively coupled with the communication interface 2740 (including a network information server or other network device). These non-transitory computer-readable media are means for providing software and/or other data to the system 2700.

The system 2700 may also include optional wireless communication components that facilitate wireless communication over a voice network and/or a data network (e.g., in the case of the user system 220). The wireless communication components comprise an antenna system 2770, a radio system 2765, and a baseband system 2760. The baseband system 2760 is communicatively coupled with the processor 2710. In the system 2700, radio frequency (RF) signals are transmitted and received over the air by antenna system 2770 under the management of the radio system 2765.

INDUSTRIAL APPLICABILITY

Operators of a machine at a work site may be trained to operate the respective machine. However, for any number of reasons, an operator may become unavailable to operate the machine on a particular day. In such scenarios, it becomes beneficial to be able to train a potential operator on the machine, for example, to avoid machines and/or work sites sitting idle while the original operator is unavailable. While some work sites may have the resources to have stand-alone device to facilitate training a potential operator on how to operate the particular machine, there is a large acquisition cost associated with such devices and, thus, may not be practical for all work sites. Additionally, while some equipment manufacturers may periodically provide training sessions for their machines, attending the training sessions may involve traveling to an off-site location and/or being able to coordinate the downtime at the work site with the training sessions.

Aspects disclosed herein overcome the one or more these obstacles associated with training a potential operator by providing an operator training application that may be used via a virtual reality headset. The virtual reality headset, as described in connection with the head mountable display system 300 of FIG. 3, may be used at any point on a work site to train a machine operator via basic machine walkarounds, operations, and/or detailed guided application. The cost of the head mountable display system 300 may enable the operator training application to be accessible to work sites having limited resources. Additionally, the head mountable display system 300 may be used at any point and/or location and, thus, enable the potential operator to become trained with limited notice.

Notably, the disclosed aspects provide an immediate (or instant) learning assessment to the potential operator so that the potential operator is able to confirm that they are qualified to operate the machine and/or to identify areas of improvement. Thus, aspects disclosed herein provide a solution to training potential operators without the cost associated with stand-alone devices and/or traveling to off-site locations, while also providing a consistent training experience across operators.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented for work site machines, such as an asphalt compactor, it will be appreciated that they can be implemented for various other types of machines, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. An operator training system for operator training at a work site on the operation of a machine, comprising:
   a head mountable display device including a display screen;
   at least one hand control including at least one navigation control; and
   a controller in communication with the head mountable display device and the at least one hand control, the controller configured to:
      generate a first set of graphical user interfaces associated with setup of an operator training application;
      display the first set of graphical user interfaces via the display screen;
      receive, from the at least one hand control, data based on at least one virtual object displayed via the first set of graphical user interfaces;
      generate, based in part on the data, a second set of graphical user interfaces associated with at least one task associated with a training scenario corresponding to operating the machine on the work site, the second set of graphical user interfaces including one or more representations of at least a portion of the machine, the at least one task requires the operator to utilize the at least one hand control to interact with the one or more representations of at least a portion of the machine, and the second set of graphical user interfaces depict the operator's interactions with the one or more representations of at least a portion of the machine as they occur via the at least one hand control; and
      display the second set of graphical user interfaces via the display screen.

2. The operator training system of claim 1, wherein the machine includes an asphalt compactor.

3. The operator training system of claim 1, wherein the head mountable display device includes a virtual reality headset and the at least one hand control includes a virtual reality hand control.

4. The operator training system of claim 1, wherein the first set of graphical user interfaces include a plurality of virtual objects that are selectable via the at least one hand control.

5. The operator training system of claim 4, wherein the at least one virtual object displayed via the first set of graphical user interfaces corresponds to the training scenario.

6. The operator training system of claim 1, wherein the at least one task associated with the training scenario includes at least one of a machine walkaround task, a machine settings task, and a path overlay task.

7. The operator training system of claim 1, wherein the controller is further configured to:
   receive, from the at least one hand control, second data associated with the at least one task;
   generate an assessment based in part on the second data; and
   display a third set of graphical user interfaces including the assessment via the display screen.

8. The operator training system of claim 7, wherein the assessment includes at least one of a score assessment and feedback.

9. The operator training system of claim 1, wherein the training scenario includes at least one of an asphalt compactor rolling pattern scenario, a paving-by-numbers scenario, and a milling-by-numbers scenario.

10. A computer-implemented method for operator training at a work site on the operation of a machine, comprising:
   generating, at a controller, a first set of graphical user interfaces associated with setup of an operator training application;
   displaying, via a display screen of a head mountable display device in communication with the controller, the first set of graphical user interfaces;
   receiving, from at least one hand control in communication with the controller, data based on at least one virtual object displayed via the first set of graphical user interfaces;
   generating, based in part on the data, a second set of graphical user interfaces associated with at least one task associated with a training scenario corresponding to operating the machine on the work site, the second set of graphical user interfaces including one or more representations of at least a portion of the machine, the at least one task requires the operator to utilize the at least one hand control to interact with the one or more representations of at least a portion of the machine, and the second set of graphical user interfaces depict the operator's interactions with the one or more representations of at least a portion of the machine as they occur via the at least one hand control; and
   displaying the second set of graphical user interfaces via the display screen.

11. The computer-implemented method of claim 10, wherein the machine includes an asphalt compactor.

12. The computer-implemented method of claim 10, wherein the head mountable display device includes a virtual reality headset and the at least one hand control includes a virtual reality hand control.

13. The computer-implemented method of claim 10, wherein the first set of graphical user interfaces include a plurality of virtual objects that are selectable via the at least one hand control.

14. The computer-implemented method of claim 13, wherein the at least one virtual object displayed via the first set of graphical user interfaces corresponds to the training scenario.

15. The computer-implemented method of claim 10, wherein the at least one task associated with the training scenario includes at least one of a machine walkaround task, a machine settings task, and a path overlay task.

16. The computer-implemented method of claim 10, further including:
   receiving, from the at least one hand control, second data associated with the at least one task;
   generating an assessment based in part on the second data, the assessment including at least one of a score assessment and feedback; and
   displaying a third set of graphical user interfaces including the assessment via the display screen.

17. The computer-implemented method of claim 10, wherein the training scenario includes at least one of an asphalt compactor rolling pattern scenario, a paving-by-numbers scenario, and a milling-by-numbers scenario.

18. A non-transitory computer-readable medium having instructions stored therein, wherein the instructions, when executed, cause a processor to:
   generate, at a controller, a first set of graphical user interfaces associated with setup of an operator training application;
   display, via a display screen of a head mountable display device in communication with the controller, the first set of graphical user interfaces;
   receive, from at least one hand control in communication with the controller, data based on at least one virtual object displayed via the first set of graphical user interfaces;
   generate, based in part on the data, a second set of graphical user interfaces associated with at least one task associated with a training scenario corresponding to operating a machine on a work site, the second set of graphical user interfaces including one or more representations of at least a portion of the machine, the at least one task requires the operator to utilize the at least one hand control to interact with the one or more representations of at least a portion of the machine, and the second set of graphical user interfaces depict the operator's interactions with the one or more representations of at least a portion of the machine as they occur via the at least one hand control;
   display the second set of graphical user interfaces via the display screen; and
   receive data from the at least one hand control indicating the operator's interaction with the one or more representations of at least a portion of the machine.

\* \* \* \* \*